US012626279B2

(12) United States Patent
Blaikie, III et al.

(10) Patent No.: US 12,626,279 B2
(45) Date of Patent: May 12, 2026

(54) SYSTEM AND METHOD FOR TOKENIZED LICENSING OF CONTENT

(71) Applicant: Datavault AI Inc., Beaverton, OR (US)

(72) Inventors: Alfred Blair Blaikie, III, Tinton Falls, NJ (US); Nathaniel T. Bradley, Tucson, AZ (US); Joshua S. Paugh, Tucson, AZ (US); Mark Baker, Marietta, GA (US)

(73) Assignee: Datavault AI, Inc., Beaverton, OR (US)

( * ) Notice: Subject to any disclaimer, the term of this patent is extended or adjusted under 35 U.S.C. 154(b) by 193 days.

(21) Appl. No.: 17/842,328

(22) Filed: Jun. 16, 2022

(65) Prior Publication Data

US 2022/0318853 A1 Oct. 6, 2022

Related U.S. Application Data

(63) Continuation-in-part of application No. 17/704,905, filed on Mar. 25, 2022, which is a continuation of application No. 16/870,689, filed on May 8, 2020, now Pat. No. 11,315,150.

(60) Provisional application No. 63/242,123, filed on Sep. 9, 2021, provisional application No. 62/908,252, filed on Sep. 30, 2019, provisional application No. 62/845,057, filed on May 8, 2019.

(51) Int. Cl.
*G06Q 30/02* (2023.01)
*G06Q 30/0251* (2023.01)

(52) U.S. Cl.
CPC ..... *G06Q 30/0269* (2013.01); *G06Q 30/0255* (2013.01); *G06Q 30/0261* (2013.01)

(58) Field of Classification Search
CPC .......... G06Q 30/0255; G06Q 30/0261; G06Q 30/0269
See application file for complete search history.

(56) References Cited

U.S. PATENT DOCUMENTS 7,860,763 B1 12/2010 Quinn
8,204,805 B2 6/2012 Eftekhari
(Continued)

FOREIGN PATENT DOCUMENTS

CN 108537664 A 9/2018
WO 2017190175 A1 11/2017
(Continued)

OTHER PUBLICATIONS

International Search Report and Written Opinions, PCT/US2022/075985, Dec. 6, 2022, 12 Pages.
(Continued)

*Primary Examiner* — Scott C Anderson
(74) *Attorney, Agent, or Firm* — Goodhue, Coleman & Owens, P.C.

(57) ABSTRACT

A system, method, and device for monetizing content. Content associated with tokens managed by a system are automatically searched for. The content is identified. Utilization of the content by one or more parties is verified according to a license of a smart contract. The license is enforced against the one or more parties in response to determining the license is not verified. License fees are collected for utilization of the content associated with the tokens. The user is compensating accorded to the terms of the smart contract.

16 Claims, 17 Drawing Sheets

(56)     References Cited

U.S. PATENT DOCUMENTS

| | | | |
|---|---|---|---|
| 8,838,492 B1 | 9/2014 | Baker | |
| 9,760,953 B1 | 9/2017 | Wang | |
| 9,870,588 B1 | 1/2018 | Genov | |
| 10,114,969 B1 | 10/2018 | Chaney et al. | |
| 10,163,129 B1 | 12/2018 | Agarwal et al. | |
| 10,255,641 B1 | 4/2019 | Goldman | |
| 10,318,979 B2 | 6/2019 | Frank et al. | |
| 10,341,105 B2 | 7/2019 | Innes et al. | |
| 10,346,826 B2 | 7/2019 | Boudville | |
| 10,482,174 B1 | 11/2019 | Goodsitt | |
| 10,628,894 B1 | 4/2020 | Ioannou | |
| 10,685,407 B1 | 6/2020 | Cabrera | |
| 10,867,355 B1 | 12/2020 | Wang | |
| 10,943,309 B1 | 3/2021 | Morin | |
| 11,269,665 B1 | 3/2022 | Podgorny | |
| 2002/0176712 A1* | 11/2002 | Brown | H04N 7/181 |
| | | | 348/E7.086 |
| 2004/0128253 A1 | 7/2004 | Jim | |
| 2005/0114266 A1* | 5/2005 | Satkunanathan | G06Q 30/06 |
| | | | 705/59 |
| 2007/0112567 A1* | 5/2007 | Lau | G06Q 30/02 |
| | | | 704/240 |
| 2007/0250700 A1 | 10/2007 | Sidhu et al. | |
| 2007/0288312 A1 | 12/2007 | Wang | |
| 2009/0157534 A1 | 6/2009 | Arsiwala | |
| 2010/0076876 A1 | 3/2010 | Brady | |
| 2010/0179860 A1 | 7/2010 | Noel | |
| 2011/0208621 A1 | 8/2011 | Feierstein | |
| 2012/0323718 A1 | 12/2012 | Shkedi | |
| 2013/0132300 A1 | 5/2013 | Margolis | |
| 2014/0038553 A1* | 2/2014 | Gordon | H04L 67/535 |
| | | | 455/410 |
| 2014/0164251 A1 | 6/2014 | Loh | |
| 2014/0214636 A1 | 7/2014 | Rajsky | |
| 2014/0280231 A1* | 9/2014 | Paruchuri | G06F 16/245 |
| | | | 707/749 |
| 2014/0344015 A1 | 11/2014 | Puértolas-Montañés et al. | |
| 2015/0304601 A1* | 10/2015 | Hicks | H04N 5/77 |
| | | | 386/224 |
| 2016/0104153 A1 | 4/2016 | Anderson | |
| 2016/0140668 A1 | 5/2016 | Maguire | |
| 2016/0342977 A1 | 11/2016 | Lam | |
| 2017/0011460 A1 | 1/2017 | Molinari | |
| 2017/0111345 A1 | 4/2017 | Heiman | |
| 2017/0126644 A1 | 5/2017 | Ullrich et al. | |
| 2017/0134161 A1 | 5/2017 | Goeringer et al. | |
| 2017/0169363 A1 | 6/2017 | Salmasi et al. | |
| 2017/0206523 A1 | 7/2017 | Goeringer et al. | |
| 2017/0214522 A1 | 7/2017 | Code et al. | |
| 2017/0220540 A1 | 8/2017 | Wang | |
| 2017/0221029 A1 | 8/2017 | Lund et al. | |
| 2017/0230109 A1 | 8/2017 | Kawai | |
| 2017/0243143 A1 | 8/2017 | Engstrom | |
| 2017/0295023 A1 | 10/2017 | Madhavan et al. | |
| 2017/0301026 A1 | 10/2017 | Bensemana | |
| 2017/0301031 A1 | 10/2017 | Naqvi | |
| 2017/0330174 A1 | 11/2017 | DeMarinis et al. | |
| 2017/0337534 A1 | 11/2017 | Goeringer et al. | |
| 2017/0346833 A1 | 11/2017 | Zhang | |
| 2017/0372278 A1 | 12/2017 | Frolov et al. | |
| 2018/0001184 A1* | 1/2018 | Tran | G16H 50/20 |
| 2018/0040073 A1 | 2/2018 | Ghosh | |
| 2018/0101771 A1 | 4/2018 | Schwarm | |
| 2018/0121337 A1 | 5/2018 | Unsal | |
| 2018/0144153 A1 | 5/2018 | Pead | |
| 2018/0144340 A1 | 5/2018 | Kinnaird et al. | |
| 2018/0189732 A1* | 7/2018 | Kozloski | G06F 8/71 |
| 2018/0218456 A1 | 8/2018 | Kolb | |
| 2018/0225693 A1 | 8/2018 | Postrel | |
| 2018/0232775 A1 | 8/2018 | Kim et al. | |
| 2018/0262493 A1* | 9/2018 | Andrade | G06F 21/31 |
| 2018/0276626 A1 | 9/2018 | Laiben | |
| 2018/0300693 A1 | 10/2018 | Gopinath et al. | |
| 2018/0300772 A1 | 10/2018 | Bushong, Jr. | |
| 2018/0314884 A1 | 11/2018 | Lee | |
| 2018/0351949 A1 | 12/2018 | Scott et al. | |
| 2018/0359041 A1* | 12/2018 | Lee | H04N 21/6581 |
| 2018/0365686 A1 | 12/2018 | Kondo | |
| 2019/0019208 A1 | 1/2019 | Postrel | |
| 2019/0019218 A1 | 1/2019 | Thompson et al. | |
| 2019/0026828 A1 | 1/2019 | Preston et al. | |
| 2019/0043050 A1 | 2/2019 | Smith et al. | |
| 2019/0050926 A1 | 2/2019 | Cooper | |
| 2019/0052722 A1 | 2/2019 | Gasking | |
| 2019/0058580 A1 | 2/2019 | Tormasov et al. | |
| 2019/0066063 A1 | 2/2019 | Jessamine | |
| 2019/0066205 A1 | 2/2019 | Marks | |
| 2019/0066206 A1 | 2/2019 | Marks | |
| 2019/0080402 A1 | 3/2019 | Molinari et al. | |
| 2019/0080407 A1 | 3/2019 | Molinari et al. | |
| 2019/0087844 A1 | 3/2019 | Leekley | |
| 2019/0087893 A1 | 3/2019 | Pellew | |
| 2019/0095439 A1 | 3/2019 | Cai | |
| 2019/0102454 A1 | 4/2019 | Sato et al. | |
| 2019/0102837 A1 | 4/2019 | Smith et al. | |
| 2019/0114706 A1 | 4/2019 | Bell et al. | |
| 2019/0121813 A1 | 4/2019 | Galebach et al. | |
| 2019/0122243 A1 | 4/2019 | Mizzone | |
| 2019/0122258 A1 | 4/2019 | Bramberger et al. | |
| 2019/0130451 A1 | 5/2019 | Logvinov | |
| 2019/0130701 A1* | 5/2019 | Simons | H04L 9/3226 |
| 2019/0141048 A1 | 5/2019 | Fallah et al. | |
| 2019/0147471 A1 | 5/2019 | McKelvey et al. | |
| 2019/0149633 A1 | 5/2019 | Evans et al. | |
| 2019/0155997 A1 | 5/2019 | Vos et al. | |
| 2019/0156304 A1 | 5/2019 | Hudson et al. | |
| 2019/0156363 A1 | 5/2019 | Postrel | |
| 2019/0163700 A1 | 5/2019 | Baumgardner et al. | |
| 2019/0164140 A1 | 5/2019 | Pasupula | |
| 2019/0172067 A1 | 6/2019 | Arora et al. | |
| 2019/0172153 A1 | 6/2019 | Wyle | |
| 2019/0180266 A1 | 6/2019 | Sidhu | |
| 2019/0180307 A1 | 6/2019 | Cohen et al. | |
| 2019/0188411 A1 | 6/2019 | Kroutik | |
| 2019/0205563 A1 | 7/2019 | Gonzales | |
| 2019/0205932 A1 | 7/2019 | Ericson | |
| 2019/0213633 A1 | 7/2019 | Kokernak | |
| 2019/0236214 A1 | 8/2019 | Kokernak | |
| 2019/0236286 A1 | 8/2019 | Scriber et al. | |
| 2019/0236698 A1 | 8/2019 | Postrel | |
| 2019/0244243 A1 | 8/2019 | Goldberg et al. | |
| 2019/0258780 A1* | 8/2019 | Minina | G06F 16/24 |
| 2019/0342095 A1 | 11/2019 | Simons | |
| 2019/0347442 A1 | 11/2019 | Marlin | |
| 2020/0058023 A1 | 2/2020 | Travizano | |
| 2020/0074461 A1 | 3/2020 | DeRosa-Grund | |
| 2020/0162266 A1* | 5/2020 | Miller | H04L 9/3239 |
| 2020/0219150 A1* | 7/2020 | Johnston | G06Q 30/0282 |
| 2020/0234268 A1 | 7/2020 | Kohli | |
| 2020/0236091 A1 | 7/2020 | Cooley | |
| 2020/0394723 A1 | 12/2020 | Baker | |
| 2021/0192075 A1 | 6/2021 | Sweeney | |
| 2022/0309540 A1 | 9/2022 | Blaikie, III | |
| 2022/0309541 A1 | 9/2022 | Blaikie, III | |

FOREIGN PATENT DOCUMENTS

| | | |
|---|---|---|
| WO | 2017197110 A1 | 11/2017 |
| WO | 2018007828 A2 | 1/2018 |
| WO | 2018058105 A1 | 3/2018 |
| WO | 2018209153 A1 | 11/2018 |
| WO | 2018211382 A1 | 11/2018 |
| WO | 2019051401 A1 | 3/2019 |
| WO | 2019083693 A1 | 5/2019 |
| WO | 2019094153 A1 | 5/2019 |
| WO | 2019099335 A1 | 5/2019 |
| WO | 2019113138 A1 | 6/2019 |
| WO | 2019121659 A1 | 6/2019 |

(56) References Cited

FOREIGN PATENT DOCUMENTS

| WO | 2019133309 A1 | 7/2019 |
| WO | 2019152732 A1 | 8/2019 |

OTHER PUBLICATIONS

Saraji et al. "A blockchain-based carbon credit ecosystem." (2021 ). Jul. 1, 2021 (Jul. 1, 2021} Retrieved on Oct. 24, 2022 (Oct. 24, 2022) from. 12 pages.

International Preliminary Report, PCT/US2019/059920, May 20, 2021, 8 pages.

International Search Report & Written Opinion, PCT/US2020/025495, Jul. 2, 2020, 15 pages.

* cited by examiner

RECEIVE A USER PROFILE FOR A USER  300

TRACK TRANSACTION INFORMATION FOR A USER THROUGH ONE OR MORE DATA CLEARING HOUSE  302

COMPILE AND VERIFY THE INFORMATION ASSOCIATED WITH THE USER  304

PERFORM DATA RECONCILIATION OF THE INFORMATION WITH AVAILABLE ADVERTISEMENT DATA  306

CREATE TARGETED ADVERTISEMENTS BASED ON THE DATA  308

RED THURSDAY SALE
-ONE TIME ONLY-

BECAUSE RED THURSDAY JUST DOESN'T
SOUND AS GOOD AS BLACK FRIDAY

NATE FOR YOU ONLY WE HAVE THE
FOLLOWING SPECIALS:

_600_

PERSONAL SALE ON:

| | |
|---|---|
| PROMOTIONAL VIDEOS: | $199 |
| SEO: | $50/PAGE |
| WEBPAGE OPTIMIZATION: | $25/PAGE |
| MARKETING/DIGITAL CONSULTING | $100/HR |

FIG. 6

RECEIVE AN EVENT MARKED AS IMPORTANT ⟿ 702

AUTOMATICALLY DOCUMENT INFORMATION ASSOCIATED WITH THE EVENT ⟿ 704

TOKENIZE THE EVENT AND INFORMATION ASSOCIATED WITH THE EVENT ⟿ 706

COMMUNICATE THE TOKENS ASSOCIATED WITH THE EVENT ⟿ 708

SHARE THE TOKENIZED CONTENT ⟿ 710

ASSOCIATE A TOKEN WITH A USER — 802

COMMUNICATE THE TOKEN BASED ON INPUT FROM THE USER — 804

TRACK UTILIZATION OF THE TOKEN FOR EVENT RESERVATIONS OR ACTIONS — 806

COMPENSATE THE USER FOR RECOMMENDATION AND RESERVATIONS TO THE EVENT — 808

END

CREATE THE TOKEN BASED ON ASSOCIATION WITH THE EVENT — 902

PROVIDE ADDITIONAL INFORMATION REGARDING THE EVENT — 904

RECEIVE FEEDBACK BASED ON THE ADDITIONAL INFORMATION — 906

IMPROVE COMMUNICATIONS AND OFFERS BASED ON THE FEEDBACK — 908

END

CREATE ONE OR MORE TOKENS ASSOCIATED WITH A PRODUCT OR SERVICE AND A USER ⟋1002

COMMUNICATE OR IMPLEMENT THE TOKEN BASED ON FEEDBACK FROM THE USER ⟋1004

TRACK UTILIZATION OF THE TOKEN FOR PURCHASES OF THE PRODUCT OR SERVICE ASSOCIATED WITH THE TOKEN ⟋1006

COMPENSATE THE USER FOR PURCHASES OF THE PRODUCT OR SERVICE ASSOCIATED WITH THE TOKEN ⟋1008

END

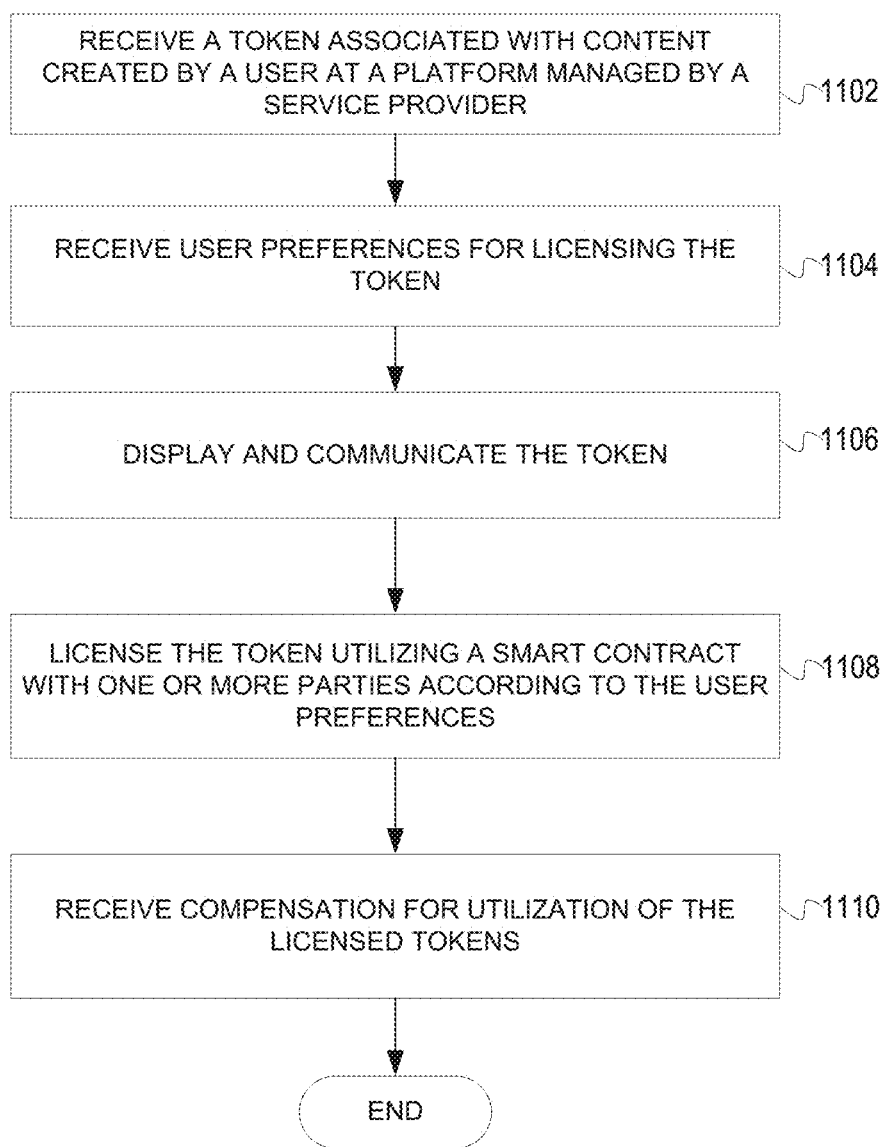

RECEIVE A TOKEN ASSOCIATED WITH CONTENT CREATED BY A USER AT A PLATFORM MANAGED BY A SERVICE PROVIDER ⌇1102

RECEIVE USER PREFERENCES FOR LICENSING THE TOKEN ⌇1104

DISPLAY AND COMMUNICATE THE TOKEN ⌇1106

LICENSE THE TOKEN UTILIZING A SMART CONTRACT WITH ONE OR MORE PARTIES ACCORDING TO THE USER PREFERENCES ⌇1108

RECEIVE COMPENSATION FOR UTILIZATION OF THE LICENSED TOKENS ⌇1110

END

FIG. 11

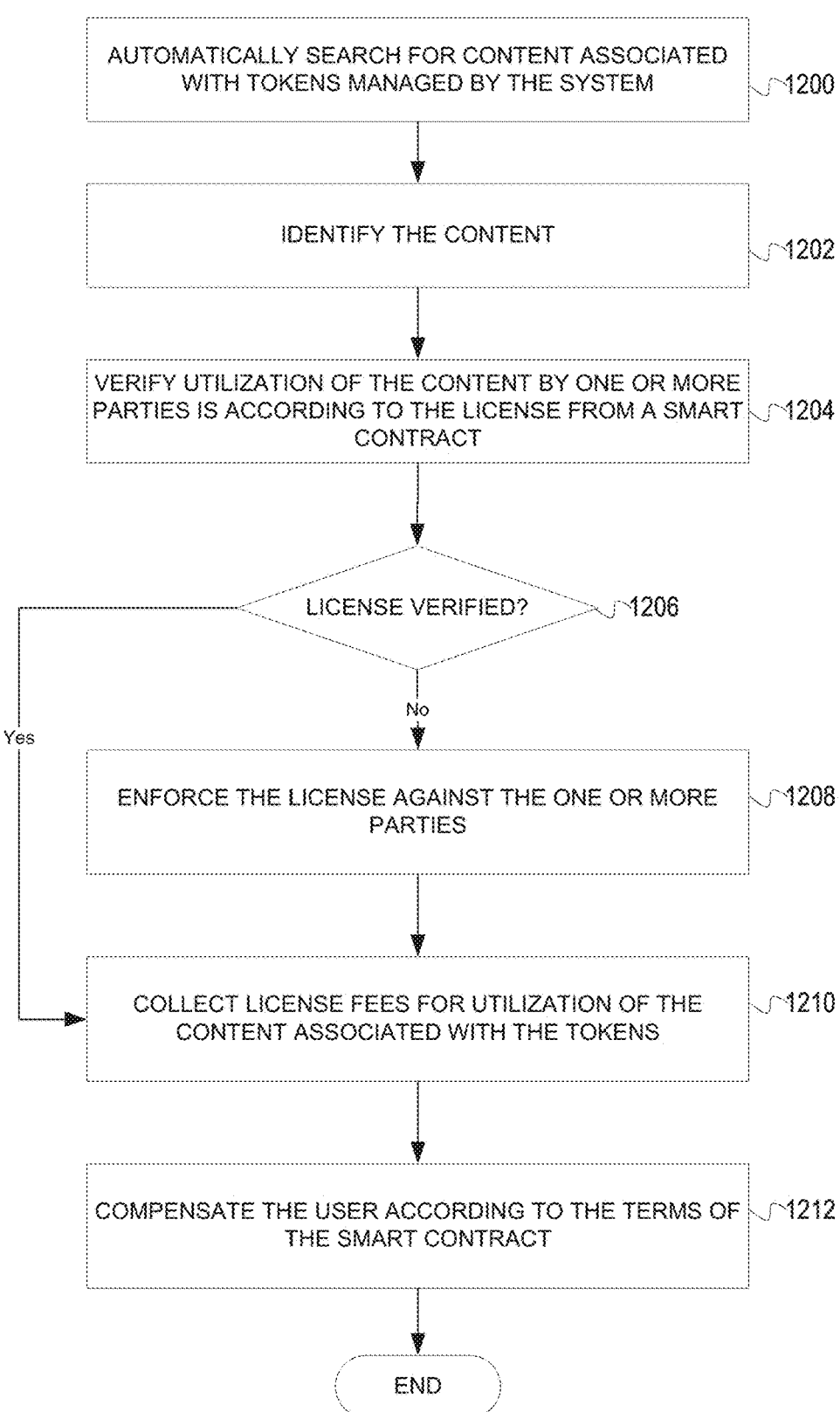

AUTOMATICALLY SEARCH FOR CONTENT ASSOCIATED WITH TOKENS MANAGED BY THE SYSTEM ⟋1200

IDENTIFY THE CONTENT ⟋1202

VERIFY UTILIZATION OF THE CONTENT BY ONE OR MORE PARTIES IS ACCORDING TO THE LICENSE FROM A SMART CONTRACT ⟋1204

LICENSE VERIFIED? ⟋1206

No

Yes

ENFORCE THE LICENSE AGAINST THE ONE OR MORE PARTIES ⟋1208

COLLECT LICENSE FEES FOR UTILIZATION OF THE CONTENT ASSOCIATED WITH THE TOKENS ⟋1210

COMPENSATE THE USER ACCORDING TO THE TERMS OF THE SMART CONTRACT ⟋1212

END

FIG. 12

COMPILE A DATA SET ASSOCIATED WITH A USER ⟞1300

GENERATE A TOKEN FOR EACH UNIQUE DATA SET ⟞1302

MONETIZE THE TOKEN BASED ON THE DATA SET ⟞1304

PERFORM DATA VALIDATION FOR THE DATA —1400

RECEIVE CONFIRMATION FROM THE USER —1402

DETERMINE IF THE DATA SET IS COMPLETE AFTER ADDING THE DATA —1404

RECEIVE INSTRUCTIONS FROM THE USER SPECIFYING HOW THEIR DATA MAY BE USED —1406

COMPENSATE THE USER FOR SHARING TOKENIZED DATA SETS WITH INTERESTED PARTIES —1408

RECEIVE A PHYSICAL, VIRTUAL, OR DATA ASSET 〜1502

ENHANCE THE ASSET THROUGH CREATOR TOOLS 〜1504

TOKENIZE THE ASSET 〜1506

WRAP THE TOKEN WITH METADATA 〜1508

MINT THE TOKEN 〜1510

EMBED AN INADUIBLE IN EACH TOKEN FOR AUTHENTICATION 〜1512

SELECT A VIRTUAL LOCATION FOR AN ORGANIZATION ⟋1602

RECEIVE DONATIONS TO SUPPORT THE VIRTUAL LOCATION ⟋1604

ESTABLISH THE VIRTUAL LOCATION UTILIZING THE DONATIONS ⟋1606

ALLOW VIRTUAL COMMUNICATIONS TO USERS AT THE VIRTUAL LOCATION ⟋1608

PERFORM INTERACTIONS AT THE VIRTUAL LOCATION ⟋1610

SYSTEM AND METHOD FOR TOKENIZED LICENSING OF CONTENT

PRIORITY

This application is a continuation-in-part of U.S. patent application Ser. No. 17/704,905 filed on Mar. 25, 2022 which is a continuation of U.S. patent application Ser. No. 16/870,689 filed on May 8, 2020 now U.S. Pat. No. 11,315, 150 which claims priority to U.S. Provisional Patent Application Nos. 62/845,057 filed May 8, 2019 and 62/908,252 filed Sep. 30, 2019, and claims priority to U.S. Provisional Patent Application No. 63/242,123 filed Sep. 9, 2021, respectively, each of which is hereby incorporated by reference in their entirety.

BACKGROUND

I. Field of the Disclosure

The illustrative embodiments relate to personal data and asset management. More specifically, but not exclusively, the illustrative embodiments relate to a network, system, method, apparatus, and platform for targeted advertising and $3^{rd}$ party solicitations of tokenized assets, via a public or private exchange (e.g., nonfungible tokens, blockchain tokens, cryptocurrency, etc.) based on a profile and user preferences.

II. Description of the Art

Current forms of terrestrial advertisements rely heavily on traditional blind advertising, such as radio and television. Even online targeting methods depend on semi-blind behavioral or demographic targeting based on cookies, website tracking, data points, and metrics. Statistics indicate that only 8% of Internet users account for 85% of the clicks on display advertisements and 56% of digital advertisements are never seen by a live human being. Internet advertisements are focused on various types of events, products, services, (e.g., paid, free, educational, entertainment, political, etc.) may miss the mark by being undesirable, irrelevant, or served after a purchase has been consummated. These targeted advertisements from platform to advertiser to consumer are monetized by the advertiser and platform and exclude the consumers from sharing in this $3^{rd}$ party monetization of their consumer owned data assets. As a result, users are limited in their ownership, control, and participation in the monetization of their online consumer data and have no unified platform to value, market and sell the rights to their data assets, physical assets, and virtual assets.

As a result of this ad-platform to advertiser monopoly, many advertisements are irrelevant to users' interests, investments, intent, purchase plans, sales plans, or desires.

SUMMARY OF THE DISCLOSURE

One embodiment provides a system, method, and device for monetizing content. Content associated with tokens managed by a system are automatically searched for. The content is identified. Utilization of the content by one or more parties is verified according to a license of a smart contract. The license is enforced against the one or more parties in response to determining the license is not verified. License fees are collected for utilization of the content associated with the tokens. The user is compensating accorded to the terms of the smart contract.

Another embodiment provides a system, method, device, and platform for tokenizing an event. An event marked as important is received. Information associated with the event is automatically documented. The event and the information associated with the event are tokenized. One or more tokens associated with the event are communicated. Another embodiment provides a processor for executing a set of instructions and a memory storing a set of instructions configured to perform the method herein described.

Another embodiment provides a system for tokenizing an event. Electronic devices execute a data application configured to determine information associated with the event. A data platform accessible by the electronic devices through one or more network executes the data application. The data platform receives an event marked as important, automatically document information associated with the event, tokenize the event and the information associated with the event, and communicate one or more tokens associated with the event.

Another embodiment provides a data platform. The data platform includes a processor for executing a set of instructions and a memory for storing the set of instructions. The set of instructions are executed to receive an event marked as important, automatically document information associated with the event, tokenize the event and the information associated with the event, and communicate one or more tokens associated with the event.

Another illustrative embodiment provides a system for tokenizing an event. The system includes electronic devices executing a data application. The data applications is configured to determine information associated with the event. The system includes a data platform accessible by the electronic devices executing the data application through one or more networks. The data platform receives an event marked as important, automatically document information associated with the event, tokenize the event and the information associated with the event, and communicate one or more tokens associated with the event.

Yet another embodiment provides a system, method, and device for virtualizing a location. A virtual location is selected for an organization. Donations are received to support the virtual location of the organization. The virtual location is established, utilizing the donations. Interactions are performed with the users at the virtual location. Another embodiment provides a processor for executing a set of instructions and a memory storing a set of instructions configured to perform the method herein described.

Another illustrative embodiment provides a method for virtualizing a location. A virtual location is selected for an organization. Donations are received to support the virtual location of the organization. The virtual location is established utilizing the donations. Users are authenticated to interact at the virtual location. Interactions with the users are enabled at the virtual location. Another embodiment provides a processor for executing a set of instructions and a memory storing a set of instructions configured to perform the method herein described.

Another embodiment provides a system for virtualizing a location. Electronic devices execute a data application configured to determine information associated with the virtual location. A data platform accessible by the electronic devices through one or more networks executes the data application. The data platform selects a virtual location for an organization, receives donations to support the virtual location of the organization, establishes the virtual location utilizing the donations and the information, and performs interactions with the users at the virtual location.

Another embodiment provides a system, method, and device for tracking, utilization of one or more tokens. One or more tokens associated with a product or service and a user are created. The tokens are communicated based on a request from the user. Utilization of the one or more tokens is tracked for purchases of the product or services associated with the one or more tokens. The user is compensated for purchases of the products or services associated with the one or more tokens.

Another embodiment provides a system, method, and device for tokenizing an asset. An asset is received. The asset is enhanced utilizing one or more creator tools of a system. The asset is tokenized. A token associated with the asset is wrapped with metadata. The token is minted. An inaudible tone is embedded in each asset for authentication.

Another embodiment provides a system for tokenizing an asset. Electronic devices execute a data application configured to determine information associated with the asset. A data platform accessible by the electronic devices through one or more network executes the data application. The data platform receive an asset, enhances the asset, tokenizes the asset, wraps a token associated with the asset with metadata, mints the token, and embeds an identifier that is emitted when accessing the token in each asset for authentication.

Another illustrative embodiment provides a system, method, device, and platform. The system includes electronic devices that execute a data application. The data application determines investment information associated with the user. A data platform accessible by the electronic devices through one or more networks executes the data application to receive the investment information for the user, tokenize the investment information in one or more blockchain tokens, reconcile the investment information with the available advertising data, create targeted advertisements based on the one or more blockchain tokens and available advertising content, and communicate the targeted advertisements to the user through one or more consumer electronic devices.

Another embodiment provides a number of electronic devices executing a data application. The data application determines investment information associated with a user. A data platform accessible by the number of electronic devices through one or more networks. The data platform executes the data application to receive the investment information for a user, tokenize the investment information in one or more blockchain tokens, reconcile the investment information with available advertising data, create targeted advertisements based on the one or more blockchain tokens and the available advertising content, and communicate the targeted advertisements to the user through one or more consumer electronic devices.

In other embodiments, the investment information may be a portfolio of the user including one or more stocks, equities, holdings, or interests associated with the user. The data platform may receive a user profile associated with the user through at least one of the electronic devices. The data platform may receive a user profile associated with the user through at least one of the electronic devices. The electronic devices may include one or more clearing houses representing trading clearing houses and credit card clearing houses. The targeted advertisements may support the portfolio of the user determined from the investment information. The investment information may be a portfolio of the user including one or more stocks, equities, holdings, or interests associated with the user. The data platform may determine whether the targeted advertisement is appropriate for the user based on the location and the activity of the user before communicating the targeted advertisement to the user. The data application may be configured to receive user preferences associated with the user. The targeted advertisements are generated utilizing the user preferences. A database in communication with the data platform saves the investment information. The user preferences specify how the investment information is utilized by the data platform.

The illustrative embodiments provide a system, method, device, and platform for generating targeted advertisements. Transaction information for a user is received. The transaction information associated with the user is verified. The information is reconciled with advertising data associated with the transaction information. Targeted advertisements are created based on the available advertising data. The targeted advertisements are communicated to the user.

Another embodiment provides a system for performing transactions for data. The system includes multiple electronic devices executing a data application. The data application is configured to determine investment information associated with the user. The system also includes a data platform accessible by the multiple electronic devices executing the data application through one or more networks. The data platform receives investment information for a user, reconciles the investment information with available advertising data, creates targeted advertisements associated with the investment information from the available advertising content, and communicates the targeted advertisements to the user through one or more consumer electronic devices.

Another embodiment provides a data platform. The data platform may include a processor for executing a set of instructions and a memory for storing the set of instructions. The set of instructions may be executed to receive investment information for a user, reconcile the investment information with available advertising data, create targeted advertisements associated with the investment information from the available advertising data, and communicate the targeted advertisements to the user.

The illustrative embodiments provide a system, method, and platform for performing transactions for data. The data is grouped. The data is associated with a platform. Transaction information for the data is received. One or more transactions are performed based on the transaction information. The verification of the transaction is provided. Another embodiment provides a processor for executing a set of instructions and a memory storing a set of instructions configured to perform the method herein described.

The illustrative embodiments provide a system, method, and platform for monetizing data. A selection is received from a user to monetize data associated with the user. The data associated with user is compiled. A security token is generated including the data. The data is monetized utilizing the security token in accordance with the selection.

In other embodiments, the data may include digital profiles that are monetized for data. Data validation may be performed through user opt-ins that are identified and confirmed by the user. Token based compensation for consumer data allows for the direct control and monetization of their data (e.g., web data, application data, profiles, personal measurements, readings, etc.). Compensation may be performed through digital currencies, hard currencies, charitable contributions, and tax deductions. The earnings for a user may also be donated. Users may be rewarded for additional data uploads, updates, additions, amendments, surveys/questionnaire fulfillment, and so forth. The tokens may be utilized to pay a vendor or third party for a product, service, system, or data, secure a digital asset, tracking the life of an asset, share a stake in an asset or company, participate in an initial coin offering, receive a reward, maintaining and managing a digital asset, make a charitable contribution, or receive a tax deduction.

Another illustrative embodiment provides a system, method, device, and platform for managing user data. One or more data elements associated with user data are received from one of a number of sources. The one or more data elements are automatically confirmed as applicable to a user. The one or more data elements are added to a data set associated with the user. A determination is made whether the data set is complete after adding the data element to the data set. One or more tokens are created based on the data set of the user. Another embodiment provides a processor for executing a set of instructions and a memory storing a set of instructions configured to perform the method herein described.

Another embodiment provides a system for utilizing user data. The system includes electronic devices executing a data application. The data application is configured to capture the user data associated with a user. The system also includes a data platform accessible by the electronic devices executing the data application through one or more networks. The data platform receives one or more data elements associated with the user data from the electronic devices, automatically confirms the one or more data elements are applicable to the user, adds the one or more data elements to a data set associated with the user, determines whether the data set is complete after adding the data element to the data set, and creates one or more tokens based on the data set of the user.

Another embodiment provides a data platform. The data platform may include a processor for executing a set of instructions and a memory for storing the set of instructions. The set of instructions may be executed to receive one or more data elements associated with the user data from one of a number of sources, automatically confirm the one or more data elements is applicable to the user, add the one or more data elements to a data set associated with the user, determine whether the data set is complete after adding the data element to the data set, and create one or more tokens based on the data set of the user.

In other embodiments, one or more of the following may be implemented. Instructions are received from the user specifying how the data set is utilized and the user is compensated for sharing the tokens with one or more interested parties. Additional data elements may be requested in response to determining the data set is incomplete utilizing questions, surveys, and a user profile associated with the user. The one or more data elements are authenticated as being associated with the user. The token is a block chain crypto token and points to the data set for secure access by one or more interested parties. Distinct data sets are clustered into a data pool, the data pool is cross populated with distinct data sets, and the data pool is segmented to identify saturation, missing, incomplete, or nonrelevant data. A determination is made regarding the relevance of the data pool to one or more interested parties. Payments are received from one or more interested parties to access the data set utilizing the token. One or more users are compensated for granting access to their data sets. The interested parties represent advertisers, marketers, or businesses that desire access to the user data in the data set. The illustrative embodiments provide a system, method, and platform for monetizing data. A selection is received from a user to monetize data associated with the user. The data associated with user is compiled. A security token is generated including the data. The data is monetized utilizing the security token in accordance with the selection.

BRIEF DESCRIPTION OF THE DRAWINGS

Illustrated embodiments are described in detail below with reference to the attached drawing figures, which are incorporated by reference herein, and where:

FIG. 6 is a pictorial representation of a targeted advertisement in accordance with an illustrative embodiment;

FIG. 11 is a flowchart for compensating users for licensed tokens in accordance with an illustrative embodiment;

FIG. 12 is a flowchart of a process for license tracking and enforcement in accordance with an illustrative embodiment;

DETAILED DESCRIPTION OF THE DISCLOSURE

Figure 1:
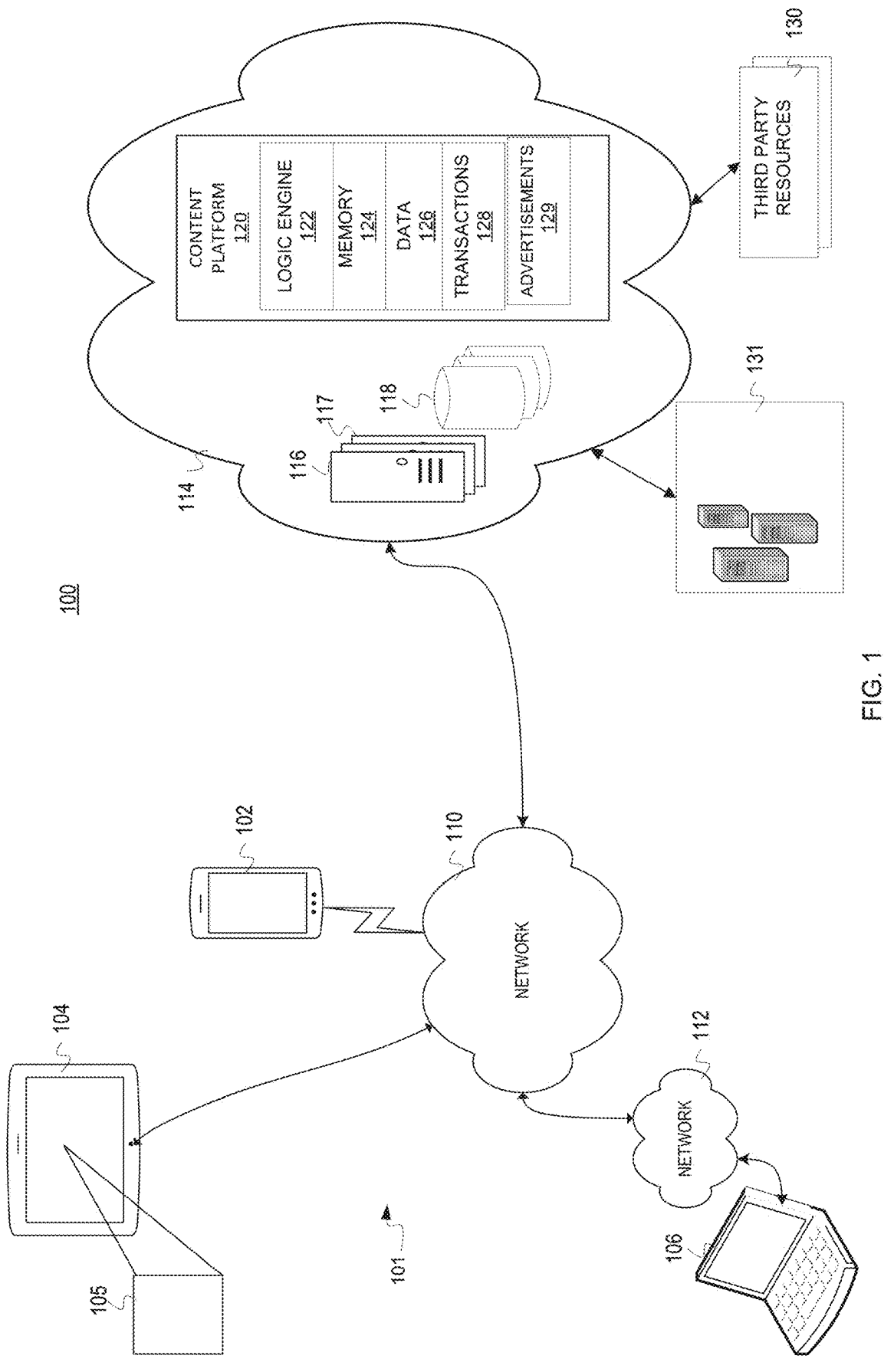
FIG. 1 is a pictorial representation of a system for managing user information in accordance with an illustrative embodiment.

The illustrative embodiments provide a system, method, network, and platform for tokenizing and monetizing an asset, data asset, or other event, goods, and services. A user indicates or marks an asset, event, good, or service as important. A single asset or, event, multiple events, or series of events may be marked. The system may automatically determine information associated with the asset, event, goods, or services. The information (e.g., asset data, event information, product information, service information, sales information, etc.), such as information for an asset or event, may include details, such as date, time, price/cost, event requirements, description and so forth. The goods or service information may further specify cost/pricing, description, legal requirements, service requirements, or so forth. The information provides distinguishing information and details regarding the event, goods, or services that most attendees, consumers, or purchasers need, desire, or want to make informed decisions.

The event, goods, or services and associated information may be tokenized. In other words, ownership or control of relevant information, access, or tickets may be associated with the token. The token may represent a nonfungible blockchain token. The tokenization process involves creation of one or more tokens associated with the event, goods, or services. The one or more tokens may be communicated, shared, distributed, or otherwise embedded.

The information may include at least date, time, price, and event requirements. The information may further include recurrences of the events. The events may be one off events, recurring events (e.g., regular, custom scheduled, etc.), or so forth. The token may be a nonfungible blockchain token that may be minted utilized to tokenize the event and the information associated with the event. The token may represent any number of different tokens. The system may track utilization of the token for event reservations or actions. The system may compensate the user for event reservations or other actions, such as sharing the token with followers, embedding it in a website/social media content, texting/emailing the token, or otherwise utilizing the token in a desired fashion. The user may be compensated in cryptocurrency or cash. A user profile associated with the user may be generated. The user profile specifies at least one or more events, goods, and services associated with the user. The user profile may include professional information, entertainment information, or preferences associated with the user. The user profile may further specify interests, needs, or requirements of the user associated with various events, goods/products, services, or so forth.

The system may provide additional information regarding the event, goods/products, or services. The event may be geofenced for highly targeted advertisement serving and customization. For example, additional details, such as sales price, discounts, rebates, purchase requirements/limitations, geographic location, time, or so forth may be shared as additional details. Feedback, input, or other information may be received through surveys, ratings, reviews, questions, comments, messages, or other applicable data and information. The system may receive feedback based on the additional information. The system may improve communications and offers based on the feedback. For example, prices may be adjusted up or down, coupons may be requested and sent, particular channels of communication may be changed (e.g., increased advertisement spends through social media, text/email campaigns, messaging changes, etc.).

The illustrative embodiments provide a network, system, method, platform and devices for data management and utilization that provides for equity holdings, credit card activity, past purchases, basket of goods analysis, and user specified parameters and preferences to be processed for the purpose of targeting content or advertisements to consumers. The illustrative embodiments create a relationship between data sets regarding ownership of stock portfolios, equities, and user associated interests and the products that consumers buy or are shopping for that are owned by the companies represented within their portfolios.

Data tracking and segmentation provides for improved real-time and online advertisements, product recommendations, stock tips and shopping recommendations via an ad-targeting network. The improvements allow advertisements to be selectively targeted based on consumer profiles that may include real-time and historical purchasing data and the real-time and historical stock and equity portfolios.

Data from multiple primary sources may be leveraged towards the targeted advertising including stock trading data, stock custody data and consumer credit and debit card transaction data.

The advertising network data is processed, and advertisements are delivered to users/consumers so that they can act in their own best interests and purchase products, services, and commodities that are in alignment with their holdings. This technology tool provides investors who own stock in specific companies a means to support that stock ownership by receiving targeted purchase recommendations and advertisements that allows consumers them to make informed purchase decisions that facilitate and support the success of each stock held within own individual investor portfolio by purchasing those products. Alternatively, when users buy products outside the products represented in their portfolios, the user may receive data and advertisements from brokers to buy or switch to the stocks associated to those products.

The illustrative embodiments utilize data records from stock transactions, equities, credit card transactions, user preferences, and other self-interests to perform targeted advertisements. Different data clearing houses, groups, or parties may be utilized to process and verify user and consumer data. For example, every stock transaction including the stock, shares, amount, type of transaction (e.g., limit, market, short, futures transaction, option, etc.), and other information is received, processed, and stored.

The illustrative embodiments provide a system, method, platform, and network for encrypting, securing, developing, and managing data valuations, transactions, and utilization. The data may be accessible from any number of authorized and connected devices. The illustrative embodiments allow users/consumers, consumer groups, companies, organizations, entities, governments, and other parties worldwide to develop data strategies and the conversion of any data into a monetizable asset (including a transactable token currency). platform for capturing, identifying, monetizing, converting, utilizing, and improving data.

As referenced herein, data refers to the personal or commercial data, user profiles, web profiles, search profiles, application profiles, and other information applicable to a user, consumer, entity, device, system, or other party. The illustrative embodiments comply with all applicable data privacy and administration rules, laws, and best practices. Any number of mobile devices, computers, machines, servers, arrays, or so forth may be utilized to implement the illustrative embodiments. A user may tokenize his/her data and convert all applicable data into an asset that may be controlled, valued, and monetized in commercial transactions. The illustrative embodiments also provide the user the ability to control data generation and the seamless utilization of the data. For example, algorithmic processing may determine how and when online and digital data is utilized and monetized, the price point or fair data valuation based on applicable pricing (e.g., demographic, global, location, utilization, etc.) based on going rates, principles of supply and demand, market economics, market analysis, machine learning, exchanges, auctions, real-time bidding, artificial intelligence, and so forth. Relevant information regarding data utilization may be acquired in real-time, based on historical transactions/archives, selling prices, or other applicable information or data that informs the value of a data sale or transaction. The illustrative embodiments allow the end user to select advertisement preferences that coincide with their stocks/shares, ownerships, interests, holdings, demographics, opinions, behaviors, beliefs, social structure, purchase plans, and real-world desires.

The illustrative embodiments may be utilized to perform a transaction for the data. The data may be grouped, associated, and commoditized for any number of trades, exchanges, purchases, donations, or other transactions. The data may be associated with a platform for transactions involving the data and associated advertisements. The transaction may be performed automatically or based on user input, feedback, instructions, or commands.

One embodiment provides a blockchain based security token system that gives consumers the ability to control, monetize, and/or donate any or all of the proceeds from the utilization, sale, or sharing of their profile and/or data and advertising-based revenue. The illustrative embodiments curate or collect data in real-time from users based on an opt-in system with clear compensation and renumeration guidelines. For example, any number of computing or communications devices, platforms, applications, or so forth may be utilized to capture the data.

The security tokens utilized may represent any number of existing, custom/proprietary, and other tokens. In one embodiment, formatted, structured, or unstructured data may be converted into an encrypted token that represents, includes, or references the applicable data. The security interest in a data asset may be represented in the form of a token. Data across numerous fields and with different utilizations may be captured in a token (or tokenized). For example, intelligence, counterintelligence, consumer profiles, consumer/user, private, public, ownership data, asset data, and other types of data may be captured and monetized. For example, the illustrative embodiments may provide a data management system that allows an asset, such as ownership of a digital profile to be tokenized as an asset that may be tracked, grown, and expanded through an opt in submission from multiple sources and monetized digitally through an e-commerce platform.

The security tokens may be issued, regulated, managed, and distributed by a platform to comply with the existing regulatory framework. The platform may provide a data monetization process and marketplace for creating and performing transactions between buyers and sellers (e.g., similar to a stock trading platform). The illustrative embodiments may apply pricing based on a set price range, guidelines, industry-standard, or market rate. The data in the form of a token may allow the user to directly control and monetize their data in a transparent and secure blockchain platform. Consumers may receive security tokens in several ways when they sign up to participate in the system/service, when and where they opt in to include their data in the marketplace, and when corporations and/or third parties purchase or monetized access to their data. For example, the data may be managed within a self-directed and mobile computing environment. The illustrative embodiments allow users to determine how and when their data is shared and monetized eliminating guesswork used by search, advertising, and marketing companies to generate user approved and desired consumer marketing data.

In one embodiment, the asset of data is created by the opt-in submission of a user's stock/ownership/interest profile, trading profile/account, social network profile(s), website utilization profiles, or generic/customized profile, and the associated data. The platform may be further used to secure all rights to any revenue streams associated with the data asset (e.g., any sale, sharing, or monetization of the user profile to a third party, site, or advertiser). By opting into the program, the user is providing their profile and perfecting the profile to match their actual daily living and purchases of products. As a result, the illustrative embodiments put the user in full control of the use and monetization of their data while avoiding the erroneous or inaccurate use of information inherent in currently available blind or behavioral advertising programs and systems. The illustrative embodiments take third-party unauthorized or on monetized used of poor user data and enables an accurate and monetized data stream to be created for the user. The user benefits as do the third parties that are using the more accurate data. For example, assets associated with the user (e.g., stocks, hedge funds, business entities, charitable organizations, etc.) may benefit by adding revenue, increasing in value/valuation, and otherwise benefiting the user.

The illustrative embodiments may enable the user to track utilization and monetization of their data in a more transparent fashion. As a result, the user may be able to see and track dividends, revenue sharing, price appreciation, or other forms of data asset monetization. For example, a value-based reward system tracked utilizing blockchain may be implemented. Smart contracts may be utilized with blockchain to ensure proper utilization and monetization of the data for verification purposes. The secured token generation process of the user data/profile provides proof of ownership to the user and ensures contract conditions are written into the smart contract code within the blockchain structure. The blockchain records maintain and track the creation, issuance, management, and monetization of each token throughout the lifetime of the user's involvement and ownership of their data. In one embodiment, a user may be rewarded with additional tokens for keeping their data/profile updated as well as for additional participation in surveys, watch a video, visit a site, verify, a purchase, add studies, product marketing, expanded data provisioning, and questionnaires.

The user may be incentivized to provide additional data, such as pictures, audio content, videos, location (e.g., real-time, GPS, beacon, triangulation, delayed for safety, historical, etc.), Internet protocol address, identification of friends from each social network, social media feed, sharing access to third-party applications, search data, views, likes, shares, comments, and so forth. As a result, the user may specify advertisement preferences that are associated with their stocks, portfolio, assets, equities, holdings, interests, demographics, opinions, behaviors, beliefs, social structure, purchase plans, brand affinities, and real-world desires. The user data that is recorded and stored may reside permanently on the blockchain, but typically only has a three-year lifecycle to be relevant. Thus, the user is incentivized to maintain, share, and update their data and associated profiles.

The data profile may be singular to a user or may be expanded to include deeper insights into a family, group of friends, employees, or other affiliated or associated groups. For example, a family circle profile may include an opt in for parents, children, grandparents, uncles, cousins, neighbors, family friends, and so forth. The data profile may be shared as a family asset between a partner, spouse, and children allowing the family data to be managed and monetized as a single asset. As a result, advertisers and others may get deeper insights into participating users. The illustrative embodiments manage the data collection, pricing, reconciliation, verification, payments, or so forth. Advertisers may be able to identify consumer data that is relevant to their campaign in order to provide direct incentives and/or monetization for users who provide specific advertiser-based insights. For example, a user may select to support a corporate restaurant of which a brother is a part-owner, an online educational institute that a friend works for, or a business that supports charities approved of by the user.

The illustrative embodiments may also allow user to transfer or donate the revenue or value generated for a charitable deduction or associated tax deduction. Each of the described data components is 100% opt in with users being rewarded for sharing specific data points that are desirable to advertisers or other third parties. For example, users may opt-out of specific data points that the do not wish to share with advertisers. The data captured by the illustrative embodiments may be consolidated and purchased by advertisers who provide incentives, rewards, or donations in exchange for access to users and focus group data used for the mining of advertiser-based user insights, analytics, marketing, and advertisement targeting.

The illustrative embodiments may also be utilized to create a data index that catalogs user profiles, data sets, and data transactions. Advertisers may then select a pricing structure for each type of data profile component that is desirable to advertisers thereby creating a virtual market for advertisers to purchase real time user data. The changing values of the data may be tracked over time for specific user profiles, consumer groups, and data pools based on their value to advertisers. The use of security tokens tied to user profiles creates a marketable asset that gives greater validity to commercial uses of blockchain technologies and the security token market.

Security tokens may be exchanged for actual currency, preferred stock options, stock warrants, bonds, exchange traded fund (ETF) shares, cryptic or, initial coin offerings (ICO), gift cards, vouchers, and other forms of compensation.

The illustrative embodiments provide a tokenized consumer asset targeting platform and process that may be utilized by advertisers, content providers, data owners, data purchasers, and both buyers and sellers of any physical, virtual, or digital asset and is specifically utilized to better market physical and digital asset in order to better target, market, authenticate, buy, sell, and monetize, a wider range of tokenized assets and data.

FIG. 1 is a pictorial representation of a system 100 for managing user information in accordance with an illustrative embodiment. In one embodiment, the system 100 of FIG. 1 may include any number of devices 101, networks, components, software, hardware, and so forth. In one example, the system 100 may include a smart phone 102, a tablet 104 displaying graphical user interface 105, a laptop 106 (altogether devices 101), a network 110, a network 112, a cloud system 114, servers 116, databases 118, a data platform 120 including at least a logic engine 122, a memory 124, data 126, and transactions 128. The cloud system 114 may further communicate with sources 131 and third-party resources 130.

Each of the devices, systems, and equipment of the system 100 may include any number of computing and telecommunications components, devices or elements which may include processors, memories, caches, busses, motherboards, chips, traces, wires, pins, circuits, ports, interfaces, cards, converters, adapters, connections, transceivers, displays, antennas, operating systems, kernels, modules, scripts, firmware, sets of instructions, and other similar components and software that are not described herein for purposes of simplicity.

In one embodiment, the system 100 may be utilized by any number of users, organizations, or providers to aggregate, manage, review, analyze, process, distribute, advertise, market, display, and/or monetize data 126. For example, the data 126 may be utilized in marketing or advertisements for goods or services, or services associated with the stock, equity, holdings, ownership, or interests of each user (as well as family and friends as allowed or specified). In one embodiment, the goods and services represent any number of items, content, products, or services sold by a business, entity, organization, or entity. In one embodiment, the system 100 may utilize any number of secure identifiers (e.g., passwords, pin numbers, certificates, etc.), secure channels, connections, or links, virtual private networks, biometrics, or so forth to upload, manage, and secure the data 126, generate tokens, and perform applicable transactions. As noted, the system 100 may be a blockchain system that utilizes a digital ledger to track transactions 128 involving the data 126 and advertisements 129. For example, the digital ledger may store the data 126, transactions 128, and advertisements 129 along with their details, information, and data. The devices 101 are representative of multiple devices that may be utilized by businesses or consumers. The devices 101 utilize any number of applications, browsers, gateways, bridges, or interfaces to communicate with the cloud system 114, platform 120, and/or associated components.

The data 126 may include a number of different data types. The data 126 may include information relating to the stock, shares, equity, holdings, and other interests of each user. The data 126 may include information relating to companies/partners/affiliates, associated products/services, purchase date, sale date, shares/ownership percentage, and other applicable information. The data 126 may also include demographic data, consumer data, family and health data, property data, interests and activity data, and other applicable types of data. Demographic data may be a combination of static and influx data points that include age, gender, occupation, marital status, education/education level, income level, religion, birthday, family size, and so forth. Demographic data, although mostly static, is commonly quite important to marketers and other interested parties. Consumer data may include websites visited, purchase plans, purchases, brand affinity, cars, clothes, travel, and other information applicable to users, clients, customers, groups, or so forth. The family and health data may include permanent or long-lasting data elements which may be helpful for predicting future purchases and include information related to family, health, and medical conditions, such as childcare, diapers, diabetes, incontinence and may include ownership or rental information, and so forth. The family and health data have a large potential for cross marketing of data that may be deidentified and used to measure disease spread, disease concentration and may be used to isolate and indicate population groups that are the most vulnerable, as well as identifying and measuring the effect and results of proposed treatments. Property data may include information regarding ownership, rentals/renters, address, for sale, occupants, pool, and vehicle ownership. This data may be treated and value as static data (even though changes are likely and expected). The interests and activity data may include data regarding asset ownership across various asset classes, hobbies, general interests, product and brand preferences, and other applicable influx data.

The wireless device 102, tablet 104, and laptop 106 are examples of common devices that may be utilized to receive and manage data 126, perform transactions 128, and communicate advertisements 129. Other examples of devices 101 may include e-readers, cameras, video cameras, audio systems, gaming devices, vehicle systems, kiosks, point of sale systems, televisions, smart displays, monitors, entertainment devices, medical devices, virtual reality/augmented reality systems, or so forth. The devices 101 may communicate wirelessly or through any number of fixed/hardwired connections, networks, signals, protocols, formats, or so forth. In one embodiment, the smart phone 102 is a cell phone that communicates with the network 110 through a 5G connection. The laptop 106 may communicate with the network 112 through an Ethernet, Wi-Fi connection, cellular, or other wired or wireless connection.

The data 126 may be collected and sourced from any number of online and real-world sources including, but not limited to, clearinghouses (e.g., stocks, credit card transactions, purchase and basket of goods analysis, etc.), website traffic and cookie-based analytics, social media and application data, point of sale, purchase, and transaction history, loyalty programs and coupons, location-based email list for mailers, surveys and questionnaires, and other applicable sources. For example, the data 126 may include stock trading data, stock custody data, and consumer credit/debit card transaction data. The data 126 may also store information regarding a user's purchases (e.g., past, present, future, likely, etc.), interests (e.g., personal, commercial, etc.), business/business needs, and other applicable information. The data 126 may also store information regarding the family and friends of the user if authorized or requested by the user. As a result, the user may be able to support businesses and groups associated with friends and family as well by receiving targeted advertisements and potentially purchasing goods/services based on those advertisements.

These same data collection sources may be utilized to perform analysis of the data 126. In one embodiment, the data 126 may be captured through registered account information, programs/applications, website traffic, and tracking cookie-based analytics.

The data 126 may be captured through social media and applications. Social media data may be utilized to provide real-time polls, likes and dislikes, feedback, preferences for media content, site traffic, and numerous other consumer data. Any number of mobile, computing, personal assistant (e.g., Siri, Alexa, Cortana, Google, etc.), or other applications may be utilized. Social media data and interactions may be utilized as definitive or anecdotal data.

The data 126 may also be captured through point of sale, transaction, and purchase history. In one embodiment, a credit card clearing house may be utilized to capture the data. Customers, consumers, and clients may be comfortable with sharing the specific data points associated with point-of-sale transactions due to established practices or through profile deidentification. The point-of-sale transactions may include extensive data, including, but not limited to, name, address, item/service, price, credit card type, purchase location, date, brand preference, brand category, product affinity, spending levels, order history, inventory, restock data, purchase demographics, and so forth. Point-of-sale and transaction history data may have static, perennial, and influx data points with the value of each data point being tracked and measured within the data valuation index and the data derivatives marketplace.

The data 126 may also include location-based information and communications. An example of static and perennial data points that may be collected include a standard web form, email request form, wireless triangulation, routers/ towers/access points reached, proximity beacons, and so forth. The location-based communications may capture data, such as email, consumer/business addresses, phone numbers, and so forth.

The data 126 may require and solicit additional data points and may also include surveys and questionnaires. Responses to surveys and questionnaires may be one of the best ways to gather and inform information regarding the user's stocks, holdings, shares, ownership, and interests that may not be able to be determined in other ways due to privacy, entity names, applicable laws, and so forth. The ability to gather real-world consumer insights may help complete or round out a user profile. The surveys and questionnaires may be performed digitally (e.g., websites, extensions, programs, applications, browsers, texting, or manually (e.g., audibly, on paper, etc.). Responses to surveys and questionnaires may help measure and achieve saturation of datapoints for user profiles.

The cloud system 114 may aggregate, manage, analyze, and process data 126 and tokens across the Internet and any number of networks, sources 131, and third-party resources 130. For example, the networks 110, 112 and/or cloud system 114 may represent any number of public, private, virtual, specialty (e.g., trading, financial, cryptocurrency, etc.), or other network types or configurations. The different components of the system 100, including the devices 101 may be configured to communicate using wireless communications, such as Bluetooth, Wi-Fi, or so forth. Alternatively, the devices 101 may communicate utilizing satellite connections, Wi-Fi, 3G, 4G, 5G, LTE, personal communications systems, DMA wireless networks, and/or hardwired connections, such as fiber optics, T1, cable, DSL, high speed trunks, powerline communications, and telephone lines. Any number of communications architectures including client-server, network rings, peer-to-peer, n-tier, application server, mesh networks, fog networks, or other distributed or network system architectures may be utilized. The networks, 110, 112 and/or cloud system 114 of the system 100 may represent a single communication service provider or multiple communications services providers.

The sources 131 may represent any number of clearing houses, web servers, service providers (e.g., trading platforms, credit card companies, transaction processors, etc.), distribution services (e.g., text, email, video, etc.), media servers, platforms, distribution devices, or so forth. In one embodiment, the sources 131 may represent the businesses that purchase, license, or utilize the data 126, such as advertising or marketing goods and services utilizing the system 100. In one embodiment, the cloud system 114 (or alternatively the cloud network) including the data platform 120 is specially configured to perform the illustrative embodiments.

The cloud system 114 or network represents a cloud computing environment and network utilized to aggregate, process, manage, generate, sell, monetize, and distribute data 126 and advertisements 129 while supporting the transactions 128 and utilization. The cloud system 114 may implement a blockchain system for managing the data 126, transactions 128, and advertisements 129. The cloud system 114 allows data 126, transactions 128, and advertisements 129 from multiple businesses, users, managers, or service providers to be centralized. In addition, the cloud system 114 may remotely manage configuration, software, and computation resources for the devices of the system 100, such as devices 101. The cloud system 114 may prevent unauthorized access to data 126, tools, and resources stored in the servers 116, databases 118, and any number of associated secured connections, virtual resources, modules, applications, components, devices, or so forth. In addition, a user may more quickly upload, aggregate, process, manage, view, and distribute data 126 (e.g., profiles, updates, surveys, content, etc.), transactions 128, and advertisements 129 where authorized, utilizing the cloud resources of the cloud system 114 and data platform 120.

The cloud system 114 allows the overall system 100 to be scalable for quickly adding and removing users, businesses, authorized sellers, stock/interest-based information, transaction based information, analysis modules, distributors, valuation logic, algorithms, moderators, programs, scripts, filters, transaction processes, distribution partners, or other users, devices, processes, or resources. Communications with the cloud system 114 may utilize encryption, secured tokens, secure tunnels, handshakes, secure identifiers (e.g., passwords, pins, keys, scripts, biometrics, etc.), firewalls, digital ledgers, specialized software modules, or other data security systems and methodologies as are known in the art.

Although not shown, the cloud system 114 may include any number of load balancers. The load balancer is one or more devices configured to distribute the workload of processing the uploaded data 126 as well as applicable transactions to optimize resource utilization, throughput, and minimize response time and overload. For example, the load balancer may represent a multilayer switch, database load balancer, or a domain name system server. The load balancer may facilitate communications and functionality (e.g. database queries, read requests, write requests, command communications, stream processing, etc.) between the devices 101 and the cloud system 114. For example, the cloud system 114 may offload verification of users that seek to be added to the system 100 along with applicable data 126 and information. Load balancing may be performed between automatic systems and devices as well as individual users. Other intelligent network devices may also be utilized within the cloud system 114.

The servers 116 and databases 118 may represent a portion of the data platform 120. In one embodiment, the servers 116 may include a web server 117 utilized to provide a website, mobile applications, and user interface (e.g., user interface 107) for interfacing with numerous users. Information received by the web server 117 may be managed by the data platform 120 managing the servers 116 and associated databases 118. For example, the web server 117 may communicate with the database 118 to respond to read and write requests. For example, the servers 116 may include one or more servers dedicated to implementing and recording blockchain transactions and communications involving the data 126, transactions 128, and advertisements 129. For example, the databases 118 may store a digital ledger for updating information relating to the user's data 126 and transactions 128 as well as utilization of the data 126 and transactions 128 to generate and communicate the advertisements 129.

The databases 118 may utilize any number of database architectures and database management systems (DBMS) as are known in the art. The databases 118 may store the content associated with each user/consumer/purchaser which may specify an address, name, age, demographics, interests, family/friend information, biometric identifiers, payment information, permissions, settings, location, cause preferences, cause restrictions, and so forth. Any number of secure identifiers, such as tones, QR codes, serial numbers, or so forth may be utilized to ensure that content, personal, or transaction information is not improperly shared or accessed.

The user interface 105 may be made available through the various devices 101 of the system 100. In one embodiment, the user interface 105 represents a graphical user interface, audio interface, or other interface that may be utilized to manage data, transactions, and other information. For example, the user may enter or update associated data utilizing the user interface 105 (e.g., browser or application on a mobile device). The user interface 105 may be presented based on execution of one or more applications, browsers, kernels, modules, scripts, operating systems, or specialized software that is executed by one of the respective devices 101. The user interface may display current and historical data as well as trends. The user interface 105 may be utilized to set the user preferences, parameters, and configurations of the devices 101 as well as upload and manage the data, content, and implementation preferences sent to the cloud system 114. The user interface 105 may also be utilized to communicate the advertisements 129 to the user. The devices 101 (e.g., displays, indicators/LEDs, speakers, vibration/tactile components, etc.) may present, play, display, or otherwise communicate the advertisements 129 visually, audibly, tactilely, or any combination thereof.

In one embodiment, the system 100 or the cloud system 114 may also include the data platform 120 which is one or more devices utilized to enable, initiate, generate, aggregate, analyze, process, and manage data 126, transactions 128, advertisements 129, and so forth with one or more communications or computing devices. The data platform 120 may include one or more devices networked to manage the cloud network and system 114. For example, the data platform 120 may include any number of servers, routers, switches, or advanced intelligent network devices. For example, the data platform 120 may represent one or more web servers that performs the processes and methods herein described.

In one embodiment, the logic engine 122 is the logic that controls various algorithms, programs, hardware, and software that interact to receive, aggregate, analyze, rank, process, score, communicate, and distribute data, content, transactions, alerts, reports, messages, or so forth. The logic engine 122 may utilize any number of thresholds, parameters, criteria, algorithms, instructions, or feedback to interact with users and interested parties and to perform other automated processes. In one embodiment, the logic engine 122 may represent a processor. The processor is circuitry or logic enabled to control execution of a program, application, operating system, macro, kernel, or other set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may be a single chip or integrated with other computing or communications elements.

The memory 124 is a hardware element, device, or recording media configured to store data for subsequent retrieval or access at a later time. The memory 124 may be static or dynamic memory. The memory 124 may include a hard disk, random access memory, cache, removable media drive, mass storage, or configuration suitable as storage for data 126, transactions 128, instructions, and information. In one embodiment, the memory 124 and logic engine 122 may be integrated. The memory 124 may use any type of volatile or non-volatile storage techniques and mediums. In one embodiment, the memory 124 may store a digital ledger and tokens for implementing a blockchain processes.

In one embodiment, the cloud system 114 or the data platform 120 may coordinate the methods and processes described herein as well as software synchronization, communication, and processes. The third-party resources 130 may represent any number of human or electronic resources utilized by the cloud system 114 including, but not limited to, businesses, entities, organizations, individuals, government databases, private databases, web servers, research services, and so forth. For example, the third-party resources 130 may represent advertisement agencies, marketers, e-commerce companies, verification services, credit monitoring services, and others that pay for rights to use the data 126, track or provide information regarding the transactions 128, and create or monitor utilization of the advertisements 129.

In one embodiment, the data platform 120 may implement a blockchain ledger, manager, or technology. In another embodiment, the blockchain ledger may be accessible through sources 131. Any number of existing blockchain companies or providers may be utilized (e.g., Aeternity, Ethereum, Bitcoin, Dfinity, ContentKid, Blockphase, Chain of Things, Flowchain, Decissio, Cognate, SkyHive, Safe, etc.).

The blockchain is utilized as a way to store and communicate the data 126, transactions 128, and advertisements 129. The blockchain may utilized one or more distinct ledgers for different entities, services providers, types of data, users, or so forth. For example, each new user with data received by the data platform 120 is assigned a token or other secure identifier. In one embodiment, the digital tokens may be managed utilizing a key that allows the user or controlling party to access the ledger. In one example, the tokens may be controlled by the user or control may be reassigned. The blockchain may cross-reference updates to the data 126 with the original record for the data platform 120 to ensure proper maintenance, control, licensing, management, and transactions. In one example, different licensing tiers, pricing algorithms, license verification, cause information, and payments are combined to create a unique platform. The illustrative embodiments provide a system 100, cloud system 114, and data platform 120 for using user data, specifically stocks, equities, ownership, holdings, and interests, to generate selective or targeted advertising. The illustrative embodiments are performed based on the user's request, authorization, or approval to apply with all applicable laws.

The blockchain may also utilize any number of payment systems (e.g., PayPal®, Venmo®, Dwolla®, Square®, wire transfers, credit cards, Quicken®, etc.) to receive money and distribute payments to the applicable party. In one embodiment, the data platform 120 may receive a small fee or percentage per transaction, data uploaded/updated, data purchased, shared, or licensed, purchased item, browsing session, or so forth. In one embodiment, the data platform 120 may be utilized to verify users and advertisers (as well as other users/entities that utilize the data platform 120) and associated data 126 and transactions 128 associated with the data 126.

The third-party resources 130 may represent any number of electronic or other resources that may be accessed to perform the processes herein described. For example, the third-party resources 130 may represent government, private, and charitable servers, databases, websites, programs, services, and so forth for verifying the data 126, transactions 128, and the advertisements 129. In another example, auditors may verify the advertisements 129 are actually generated based on the data 126 including the transactions 128.

Various data and venue owners that access the data platform 120 may legally extract and tokenize the data 126, transactions 128, and advertisements 129 for use in the exchange provided by the system 100 by identifying and tracking data utilizing automatic data extraction tools. Any number of privacy and data policies may be implemented to ensure that applicable local, State, Federal, and International laws, standards, and practices are procedures are met.

In one embodiment, a user or consumer group represented by a user of the devices 101 or the sources 131 may elect and receive permission to collect observational data collected from secure and authorized systems to achieve access to partial or complete data from the sources 131 (e.g., professional drivers, human resources, prison records, property values, real estate sales, retail sales, retail prices, commerce, waste stream data, etc.).

The logic engine 122 may also perform valuation of the data 126 and advertisements as is taught by U.S. provisional patent application 62/755,815 entitled "Method and System for Data Valuation and Secure Commercial Monetization Platform" and filed Nov. 5, 2018 and as is taught by U.S. provisional patent application 62/826,457 entitled "Method and System for Data Futures Platform" filed Mar. 29, 2019 which are hereby incorporated by reference in their entirety. The illustrative embodiments may also support third-party utilization of the data 126 and transactions 128 to generate the advertisements 129. Various authorization, auditing, and validation processes may be performed by auditing groups, commissions, industry groups, or other professionals/entities. The various embodiments may also allow a user to donate the value of their data 126 and transactions 128 and consumption of advertisements 129.

In one embodiment, the logic engine 122 may utilize artificial intelligence. The artificial intelligence may be utilized to enhance data 126, analyze transactions 128, and generate advertisements 129 to increase value, utilization, effectiveness, and profits. For example, artificial intelligence may be utilized to review, authenticate, and validate data and transactions that are received by the system 100. The artificial intelligence of the logic engine 122 may be utilized to ensure that the data 126 is improved, accurately analyzed, and value increased. For example, it is expected that data and the associated tokens that are validated utilizing artificial intelligence may be given a premium value by advertisers.

In another embodiment, the devices 101 may include any number of sensors, appliances, and devices that utilize real time measurements and data collection to update the data 126. For example, a sensor network, wearables (e.g., watches, bands, implantable devices, etc.) and Internet of things (IOT) devices may gather user and behavioral data. The data platform 120 may also work in conjunction with hands-free data mining and measurement tools that tracks location, activity, and video-based marketing data (e.g., from GPS location, video from storefronts, beacon detection, proximity alerts, etc.) from any number of third-party sources. The user may be tracked through any number of environments, locations, and conditions. The advertisements 129 may also be generated based on the activities, actions, and location of the user.

In one embodiment, the data platform 120 may extract data from third-party platforms by opting in and providing user credentials to various applications (e.g., Charles Schwab, TD Ameritrade, E*Trade, Vanguard, Fidelity, Merrill Lynch, etc.) the data platform 120 may extract data from the sources 131.

Figure 2:
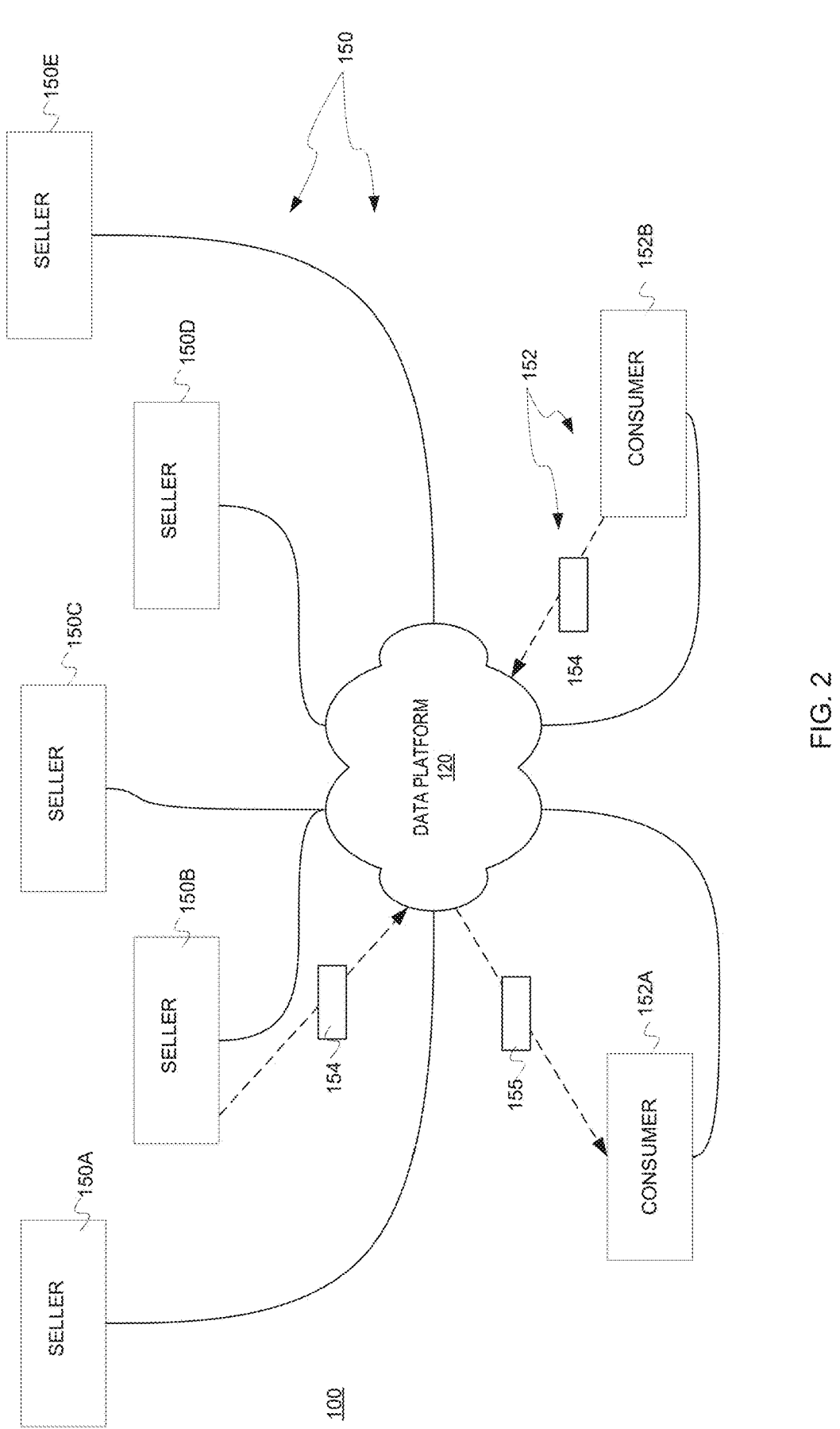
FIG. 2 further illustrates portions of the system of FIG. 1 in accordance with an illustrative embodiment.

FIG. 2 further illustrates portions of the system 100 of FIG. 1 in accordance with an illustrative embodiment. As shown the sellers 150A-E (jointly sellers 150) may represent the sources 131 of FIG. 1. The sellers 150 may represent any number of exchanges, platforms, clearinghouses, advertisers, sellers, marketers, businesses, retailers, service providers, individuals, organizations, entities, or so forth referred to as sellers 150 or businesses for purposes of simplicity. The consumers 152A, 152B (jointly consumers 152) represent any number of users, consumers, groups, or individuals that have data 154 (also including transactions) that is utilized to allow targeted advertisements 155 to that they are willing to allow the sellers 150 to access through the data platform 120. In one embodiment, the data platform 120 may represent all or portions of the system 100 of FIG. 1 (including the cloud system 114, servers 116, and databases 118).

The consumers 152 may actively or passively upload data 154 to the data platform 120. The data platform 120 may also receive amended, updated, or add additional data 154 for the consumers 152 at any time as described herein. The consumers 152 may have an agreement (e.g., contract, terms of services, permissions, authorizations, etc.) for the utilization of the data 154 by the sellers 150 or other interested parties to generate the targeted advertisements 155. The agreement or contract may specify how, when, and what portions of the data 154 may be used as well as the associated compensation terms. The agreement may specify that the data 154 may be processed, analyzed, purchased, licensed, rented, leased, or otherwise managed by the data platform 120 for the mutual benefit of the consumers 152 and the sellers 150. For example, the consumer 152B may elect to receive targeted advertisements 155 to support the companies, organizations, entities, or other groups in which the consumer 152B has stock, ownership shares, interests, holdings, or a vested interest. The consumer 152B may be interested in the targeted advertisements 155 to support herself or to support family and friends. In another example, the consumer 152B may elect to license use of their data 154 such that they are compensated utilizing a digital currency (or hard currency) for each access of or utilization of their data 154 by the sellers 150.

The data platform 120 may process raw consumer data to generate the targeted advertisements 155. The targeted advertisements 155 may be desirable to the user because the targeted advertisements 155 support the companies, stock, holdings, ownership, or interests of the user. In one embodiment, a term or logo utilized with each of the advertisements may indicate that the targeted advertisements are for the benefit of the user. In one embodiment, the targeted advertisement 155 may even include the stock ticker, name of the company, user's name, key word, identifier, certification, or so forth indicating that the targeted advertisement has gone through the analysis, authorization, and vetting process herein described.

The data platform 120 performs valuation of the data 154 and targeted advertisements 155 based on information from any number of sources including current rates, contracts, indices, exchanges, and other applicable information. For example, current targeted advertisement rates may be utilized to value the data. The tokens paid to the consumers 152 in exchange for the data 154 may vary based on the volume, quantity, verification, and types of information included in the data 154. The data platform 120 normalizes data monetization for the consumers 152 and sellers 150. Compensation performed by the data platform 120 may be performed utilizing digital currencies or hard currencies. In one embodiment, blockchain-based currencies may be utilized to compensate the consumers 152. Full tokens or partial tokens may be utilized to most accurately represent the values being exchanged. There may be a predefined number of tokens available thereby allowing early adopters of the system 100 to earn more over time. For example, in response to the consumer 152A selling or granting access to the data 154 to the data platform 120 or the seller 150B, the consumer may be compensated with tokens (e.g., Bitcoin, Ethereum, proprietary tokens, etc.). All or portions of the data 154 may be involved in a transaction. For example, in addition to stock, ownership, equities, and interest, the data 154 may include numerous components relating to all aspects of the life, work, hobbies, entertainment, studies, politics, health, family, consumer habits, for the consumer 152B. Not all of the sellers 150 may sell products, goods, or services that correspond to the stocks, holdings, and interests of the consumers 150. The seller 150D may only license rights to temporarily (e.g., for one year) access the consumer habits of the consumer 152B existing and updated in real-time. The exchange for the tokens may include a pointer to a secure storage or vault accessed through the data platform 120. The pointer may be an encryption key, access information, unique identifier, or other security information for accessing the data 154 associated with the user. In another embodiment, security tokens used for the blockchain may also be embedded with the data 154. The tokens granted through the data platform 120 may vary in value, may be fixed, or may act similar to other monetary instruments (e.g., stocks, bonds, certificates of deposit, etc.) for a specified original value of the data 154.

The data platform 120, sellers 150, or consumers 152 may keep and maintain digital ledgers that track the transactions within the system 100 to verify and authenticate the data 154, advertisements 155, and associated transactions. The sellers 150 may utilize the data 154 to advertise, sell, or market goods, services, products, perform market research, generate analytics, and otherwise generate and communicate the advertisements 155 and communicate the advertisements 155 to the consumers 152. As previously noted, the data platform 120 may also represent one or more processing, analysis, blockchain, or distribution centers, systems, devices, facilities, or so forth. The sellers 150 and consumers 152 may represent any number of individuals or groups (e.g., hundreds, thousands, millions, etc.).

As noted, the sellers 150 may send or distribute goods and services associated with the advertisements 155 through the cloud system or directly to the consumers 152. In one embodiment, the seller 150B may distribute data 154, advertisements 155, or goods and services to the consumer 152A through the data platform 120. The data platform 120 may perform distribution of the goods and services 154. For example, the data platform 120 may include any number of physical storages, digital storage, warehousing, and distribution systems, facilities, professionals, employees, contractors, electronics, and so forth.

Figure 3:
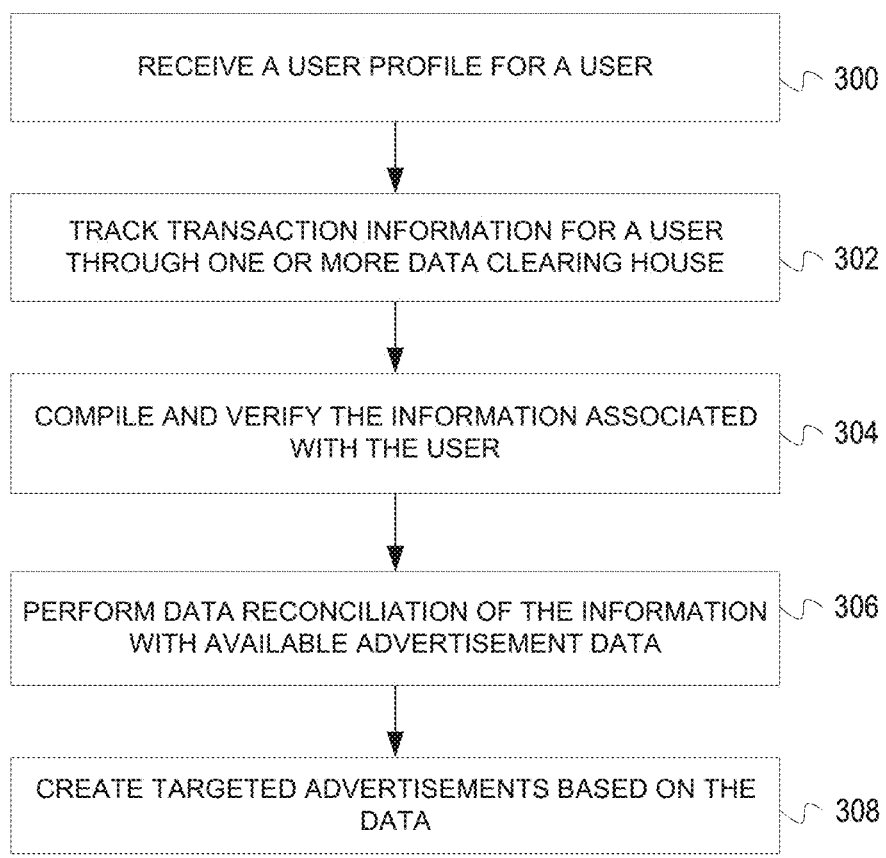
FIG. 3 is a flowchart of a process for creating targeted advertisements in accordance with an illustrative embodiment.

FIG. 3 is a flowchart of a process for creating targeted advertisements in accordance with an illustrative embodiment. The process of FIGS. 3-6 may be performed by a platform, device, server, or other equipment in accordance with illustrative embodiments (see for example the devices, servers, systems, and equipment of FIG. 1). All or portions of the process of FIGS. 3-6 may be performed automatically. The process of FIG. 3 may be implemented by a system or platform, such as the system 100, data platform 120, or devices 101 of FIG. 1 referred to generically herein as the platform.

In one embodiment, the process of FIG. 3 may begin by receiving a user profile for a user (step 300). The user profile may be generated or determined from already available information for the user. For example, the user profile may represent one or more profiles compiled by devices, accounts, services, or so forth. The user may provide answers utilizing one or more surveys, fields, questions, or other applicable information and data to determine applicable information and data. In one embodiment, step 300 may be an optional step or one that is performed over time before or after the other steps of FIG. 3. The user profile may also represent a user account or data.

Next, the platform tracks transaction information for a user through one or more data clearinghouses (step 302). The platform may track multiple types of information, data, and transactions (referred to herein as "information"). In one embodiment, the transaction information relates to stock purchases, transactions, or exchanges performed by or otherwise associated with the user. A multi-party stock purchase verification process may be utilized to confirm every applicable stock transaction. For example, the transaction information may include the stock name, ticker, date of transaction, number of shares involved, price of the shares, commissions, fees, taxes, type of transaction (e.g., market, limit, futures, short sale, option, etc.). The transaction information may also be referred to as portfolio, tokenized or investment information. The clearinghouses may represent any number of platforms, brokers, exchanges.

The transaction may also be applicable to any number of equity purchases (e.g., funds, shares, ownership, investments, interests, etc.). As noted, the transaction may represent any number of real-time, contingent, contractual based, delayed, or other transactions or pre-existing or current rights, ownership, or interests. The transaction information may be received from a data clearinghouse. For example, the platform may have an agreement with the data clearinghouse to receive the applicable information. The user may also be required to give permission for the platform to receive, analyze, process, and present information based on available data. The transaction information may also relate to a credit card, debit, or service purchase (e.g., PayPal®, Venmo®, Zelle®, etc.). For example, credit card swipes, chip readers, online transactions, or other applicable transactions or exchanges may be recorded, monitored, or otherwise documented. The transaction information may similarly include the date, purchased item/service, user or users associated with the purchase, type of card/service, purchase amount, and so forth. Other types of information and data may be determined from the applicable transaction.

Next, the platform compiles and verifies the information associated with the user (step 304). The information associated with the transactions that are tracked during step 302 may be verified to ensure accuracy of the results as generated (e.g., targeted advertisements). The information may be verified utilizing any number of processes. For example, the transaction information may be reconciled utilizing online accounts, third-party services, email receipts, or other applicable information. The illustrative embodiments are unique in the ability to cross-confirm and record each unique stock, equity, or interest-based transaction thus creating a continually evolving data record of stock portfolio ownership and user interests that may be used to provide informed purchase decisions that are directly aligned with the user's/investor's portfolio of investments. As a result, individuals, families, or groups may make better informed decisions. The platform may also analyze mutual funds, index funds, exchange traded funds (ETFs) pensions, hedge funds, and other complex holdings and portfolios to determine the holdings and interests of the user in their various proportions.

Next, the platform performs data reconciliation of the information with available advertising data (step 306). In one embodiment, a data reconciliation engine may review the applicable information to determine products/services that align with the stocks and interests of the user. For example, the user may need to perform search engine optimization for her small business, the platform may determine during step 306 that the user also owns shares in an Internet search company. As a result, search engine optimization services available through the Internet search company may be presented to the user as her best option. The user may be obtaining a needed service while also being a patron of the company that she holds shares in. Where the user owns multiple stocks, equities, interests, or holdings in companies that offer applicable services, the platform may analyze which company may most benefit from increases in revenue based on the user's spending. In one embodiment, the platform may determine a portfolio of potential advertisements for goods and services associated with the user's stocks, equities, interests, and holdings. As a result, the advertisements may be readily available in real-time or near real-time.

Next, the platform creates targeted advertisements based on the information (step 308). The targeted advertisements may represent any number of advertisements displayed to the user including Internet advertisements, in-application advertisements, television/video/Internet Protocol Television advertisements, radio/Internet radio, print advertisements, and other forms of advertisements.

In one embodiment, the process of FIG. 3 may begin in response to a selection made by the user to opt-in to targeted advertisements that benefit the user's interests rather than random advertisements. For example, the selection may involve the acceptance of financial or legal language utilizing a graphical user interface presented utilizing a web interface, mobile application, or so forth. The selection may be to receive targeted advertisements rather than generic advertisements or advertisements that are not associated with the user's stocks, holdings, and interests. In one embodiment, a profile associated with the platform may specify the companies, organizations, entities, or other groups that the user would like to support. In some examples, the various groups may represent stock, equity, interests, or holdings, but the groups may also represent companies associated with the user's friends or family. For example, if a family member is a pilot for a particular company, the user may choose to support that airline company by receiving targeted advertisements that benefit the airline directly or indirectly. The user profile referenced in step 330 may also include any number of settings, configurations, parameters, selections, releases, authorizations, verification requirements, or other information and data that controls how the user's data is utilized in accordance with the illustrative embodiments. The user referenced in FIG. 3 may also refer to a group of people, entity, organization, associated persons, or so forth. The data may also be referred to as personal data, consumer data, private data, monetized data, authorized data, advertising data, or marketing data.

Figure 4:
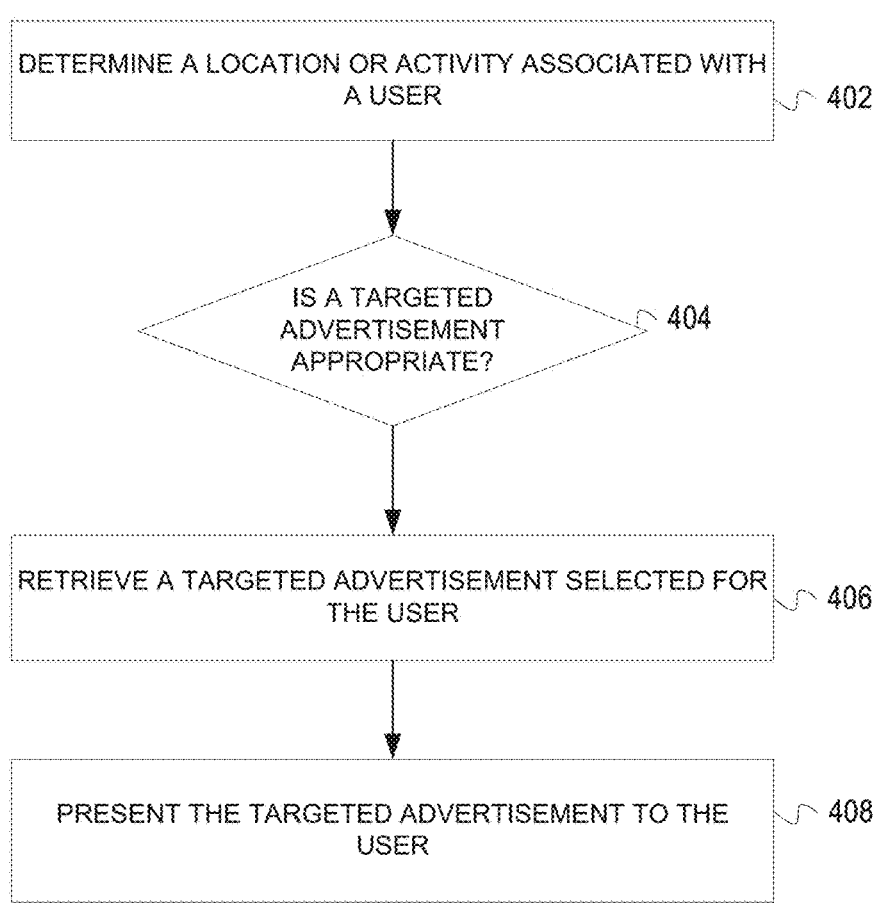
FIG. 4 is a flowchart of a process for utilizing targeted advertisements in accordance with an illustrative embodiment.

FIG. 4 is a flowchart of a process for utilizing targeted advertisements in accordance with an illustrative embodiment. The process of FIG. 4 may be implemented with or as a separate process from of FIG. 3. In one embodiment, the process of FIG. 4 may begin by determining a location or activity associated with a user (step 402). In one embodiment, one or more wireless devices associated with the user may be utilized to determine the location or activity of the user (e.g., smartphone, wireless earbuds, smartwatch, fitness tracker, gaming device, automotive GPS, etc.). The location and activities of the user may also be determined from any number of external devices, such as security systems (e.g., home, commercial, etc.), beacons, camera systems, radio frequency detectors, routers, cell towers, or other communications, computing, or advertising equipment, systems, and/or devices. The location and activities of the user may also be determined utilizing browsers, applications, or so forth. For example, the user may be browsing the Internet, playing a game, taking pictures on vacation, at the grocery store, walking the mall, at a sporting event, volunteering, or performing any number of activities.

Next, the platform determines whether a targeted advertisement is appropriate (step 404). The targeted advertisement may be appropriate based on location, activities/actions, user preferences, and so forth. There may be circumstances during which some or all targeted advertisements are not appropriate, such as selected no advertisements times, locations, or activities (e.g., funerals, vacation days, etc.). In one embodiment, the user preferences may specify how, when, and where specific targeted advertisements are shown to the user. The platform may also learn over time utilizing artificial intelligence or machine learning the types of locations, times, and activities during which it is inappropriate to display a targeted advertisement.

Next, the platform retrieves a targeted advertisement selected for the user (step 406). The targeted advertisement may be retrieved from a portfolio, queue, or other storage of advertisements. In one embodiment, the targeted advertisements may be pre-prepared for the user. As a result, the targeted advertisement may be selected based on previous processing of applicable information. The platform may have previously generated a matrix or database of products/services associated with the stocks, companies, interests, and holdings of the user. As a result, the best targeted advertisement may be selected for the user. In another embodiment, the targeted advertisements may be determined or generated in real-time. For example, the type of targeted advertisement may change based on the location, activity, or actions of the user. For example, advertisements for restaurants associated with the stock holdings of the user may be made based on the location of the user. For example, multiple restaurants as well as their associated specialties/themes/menus, reviews, location/directions, and contact information may be presented to the user.

Next, the platform presents the targeted advertisement to the user (step 408). The targeted advertisements may be presented to the user utilizing visual, audio, video, tactile, print, or other mediums. For example, Internet advertisements, in-application advertisements (e.g., YouTube, Facebook, games, Pandora, etc.), video, audio, and other advertisements may be presented to the user through available devices, systems, or equipment, such as smart televisions, wireless devices (e.g., cell phones, tablets, laptops, etc.), gaming devices, and so forth. In one embodiment, the user may be coached in real-time to select goods or services that have a benefit for their portfolio. Their portfolio may also support family, friends, charitable causes, or so forth. The targeted advertisements may give specific details to the user of how she is supporting her own portfolio by selecting to view or purchase specified goods and services.

In one embodiment, the targeted advertisements may be printed or generated in real-time for delivery or communication to the user. For example, print advertisements may be placed in a room where the user will be spending time (e.g., a conference room, hotel room, mass transit, taxi/Uber, or other location. The print advertisements may be generated on traditional paper, electronic paper that may be reused repeatedly, or other print or electronic print materials.

In one embodiment, the user may periodically be presented with goods/services that align with her stocks, holdings, and interests. The information may be presented as spreadsheets, marketing pieces/advertisements, summaries, and so forth. The presented information may be informational, data focused, visual, or advertising driven and may be presented electronically (e.g., e-mail, text messages, in-application messages, dedicated websites/preferences, videos, audio, etc.), printed, or otherwise sent.

The illustrative embodiments allow the user to collaborate their spending efforts for the benefit of their own portfolio. Rather than making random selections of goods and services, the user may make purchases that advance their own interests (including family, friends and charitable causes, where selected). Where the user has multiple potentially conflicting interests associated with competing goods and services, share information, performance information, or other details may be shared with the user. The user's portfolio may be applicable to mutual funds, index funds, hedge funds, pensions, and other investments. Special affiliations, discounts, remittances, and other relevant information may also be utilized by an algorithm or presented to the user.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible or non-transitory medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications mediums.

Computer program code for carrying out operations of the embodiments may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 5:
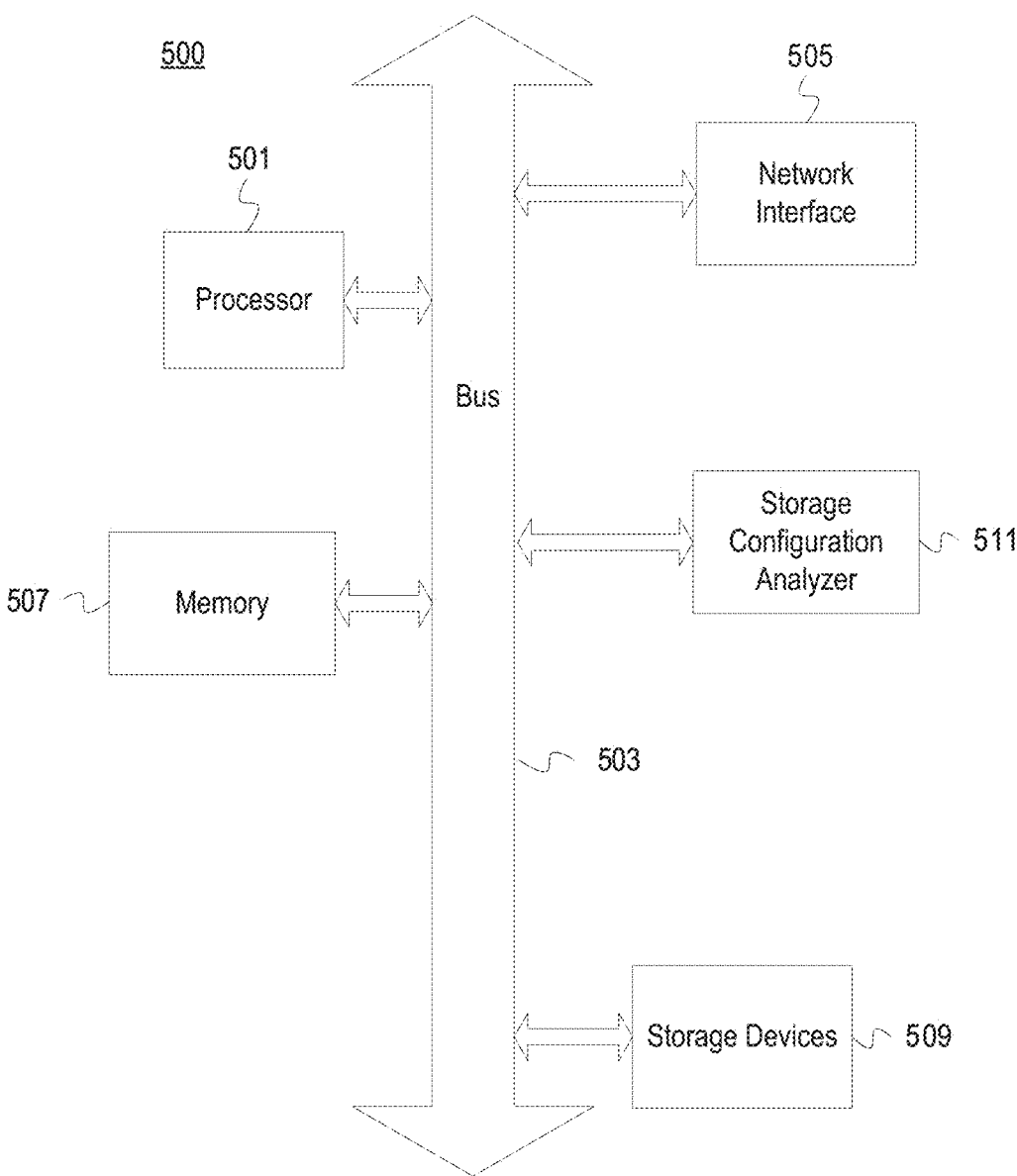
FIG. 5 depicts a computing system in accordance with an illustrative embodiment.

FIG. 5 depicts a computing system 500 in accordance with an illustrative embodiment. For example, the computing system 500 may represent a device, such as one or more of the devices 101 of FIG. 1. The computing system 500 includes a processor unit 501 (possibly including multiple processors, multiple cores, multiple nodes, and/or implementing multi-threading, etc.). The computing system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The system memory 507 embodies functionality to implement embodiments described above. The system memory 507 may include one or more functionalities that store content, blockchain data, parameters, application, user profiles, and so forth. Code may be implemented in any of the other devices of the computing system 500. Any one of these functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

FIG. 6 is a pictorial representation of a targeted advertisement 600 in accordance with an illustrative embodiment. The targeted advertisement 600 may be presented in a paper, brochure, newspaper, e-paper, digital format, or other hard copy, digital or virtual format. The targeted advertisement 600 may be communicated, presented, or played by a wireless device, cell phone, tablet, e-reader, virtual device, gaming device, heads-up display, projection, hologram, or other applicable device in a visual, audio, and/or tactile format.

In one embodiment, the targeted advertisement 600 may present personal information, such as the name of the user, company, organization, entity, family, or other individual or group that the targeted advertisement 600 is addressed to. For example, the targeted advertisement 600 may include a name or other personal information (e.g., username, need, last name, nickname, etc.) where authorized, permitted, legal, or approved by the user.

The content in the targeted advertisement 600 may be generated based on the information determined (see FIG. 3). For example, the targeted advertisement 600 may be generated for a provider that provides goods, products, and/or services of interest to the user, such as promotional videos, search engine optimization (SEO), webpage optimization, and marketing/digital consulting.

The targeted advertisement 600 may communicate information regarding any number of goods and services. As previously noted, the targeted advertisement 600 may be generated based on permissions, settings, user profiles, authorizations, or other applicable information. As noted, the utilization of the targeted advertisement 600 as well as any applicable monetization may be tracked utilizing blockchain information and data.

Figure 7:
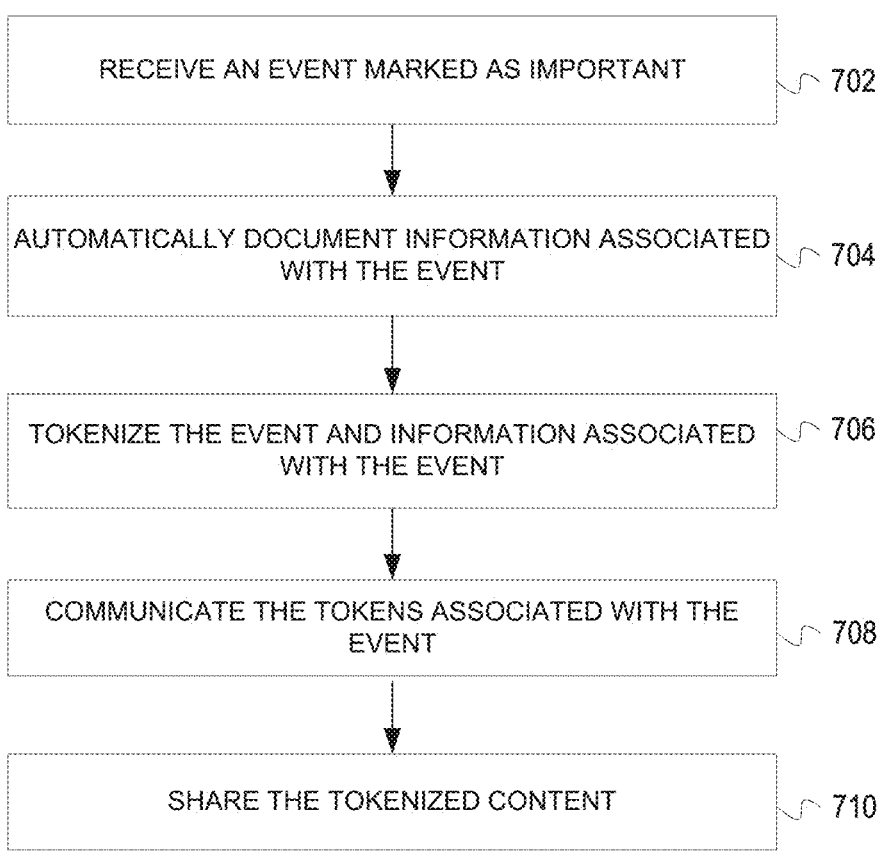
FIG. 7 is a flowchart of a process for tokenizing an event with an in accordance with an emotion embodiment.

FIG. 7 is a flowchart of a process for tokenizing an event with an in accordance with emotion embodiment. The process of FIGS. 7-16 may be performed by all or portions of a system, such as the system 100 of FIG. 1. The process of FIGS. 7-16 may be and are expected to be combined with any of the Figures and description (as described herein and/or the priority applications) in any order or combination.

The process of FIG. 7 may begin by receiving an event marked important (step 702). The event may be one that the user has, is, or will attend. The event may represent any number of different types of events associated with entertainment, work, self-improvement, education, or any number of other topics. The event may have been attended by the user for years or may be a first-time event. The event may represent a single event or series of events. For example, the event may occur yearly at a given time with a varying location. The system may receive an indication, feedback, selection, or other information from the user indicating that the event is important, required, anticipated, or otherwise relevant to the user. The user may provide input through any number of electronic devices, applications, messages, or so forth. In one embodiment, by marking the event is important, user may express the desire or importance of returning to the event in the future based on an initial or past experience. By marking the event as important, the user may indicate a desire to tokenize the event, and information associated with the event.

Next, the system automatically documents information associated with (step 704). The information may be specific to the event or user. For example, the information may specify the time, date, location, price, attendance requirements, safety protocols (e.g., medical, allowed bags/items, etc.), and other applicable information. The information may be relevant to the specified event or future variations of that event.

Next, the system tokenizes the event and information associated with the event (step 706). The system may create a token including the event and associated information. In one embodiment, the token is a non-fungible token. The token may include information such that when the token is shared, the information may be utilized to create calendar events, reminders, alerts, notifications, or so forth.

Next, the system communicates the tokens associated with the event (step 708). The in one embodiment, the user may request that the token be shared, embedded, or otherwise through any number of messages, applications (e.g., mobile applications, websites, browsers, etc.), or other devices, systems, or processes. The token may be downloaded or otherwise retrieved as minted.

Next, the system shares the tokenized content (step 710). The token may be shared through any number of electronic messages, such as text, email, QR code, in-application, or so forth. Links to the token may also be shared, distributed, or otherwise communicated. In one embodiment, the tokenized content may include calendar entries, reminders to buy tickets, reservation information, navigation details, alerts/reminders/notifications, review information and so forth.

Figure 8:
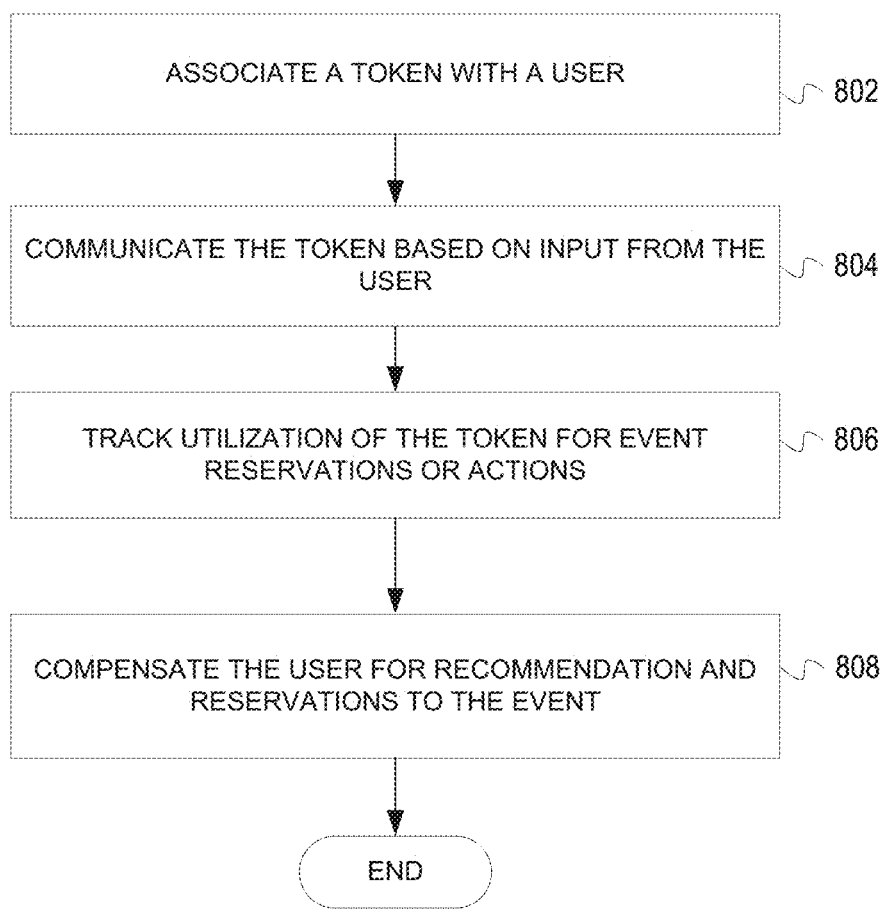
FIG. 8 is a flowchart of a process for tracking, utilization of a token associated with an event in accordance with an illustrative embodiment.

FIG. 8 is a flowchart of a process for tracking, utilization of a token associated with an event in accordance with an illustrative embodiment. The process may begin by associating the tokens with the user (step 802). In one embodiment, the token may be associated with the user during the creation or minting process. In another embodiment, the token may be associated with the user based on sharing of the token. Based on user indication, confirmation, solicitation, monetization, matching, of the token. The token may also be associated with the user based on data solicitations or advertiser requests.

Next, the system communicates the token based on input from the user (step 804). The token may be communicated through any number of processes. For example, a mobile application executed by a user on a mobile device that communicates with a similar application executed on the system may be utilized to send the token, a link to the token, or other applicable information to any communications regarding the event.

Next, the system tracks utilization of the tokens for event reservations or actions (step 806). Utilization of the token may be tracked based on clicks, views, reviews, sales, reservations, reminders, or other verifiable metrics. The tokens may be utilized to track any number of activities, actions, or inputs before, during, and after the event to maximize use of the tokens, the information associated with the tokens, and so forth.

Next, the system compensates the user for recommendations and reservations to the event (step 808). The user is compensated based on utilization of the tokens. The token itself may include terms for reservation or other actions associated with the token. For example, the token may be accessed to purchase tickets to the event. The user may be compensated in hard currency, cryptocurrency, coupons, discounts, or other forms of compensation. The user may be compensated utilizing predefined terms or agreements for reservations or other actions based on utilization or communication of one or more tokens. The user may also be compensated for views, sharing the event, engagements, or other.

Figure 9:
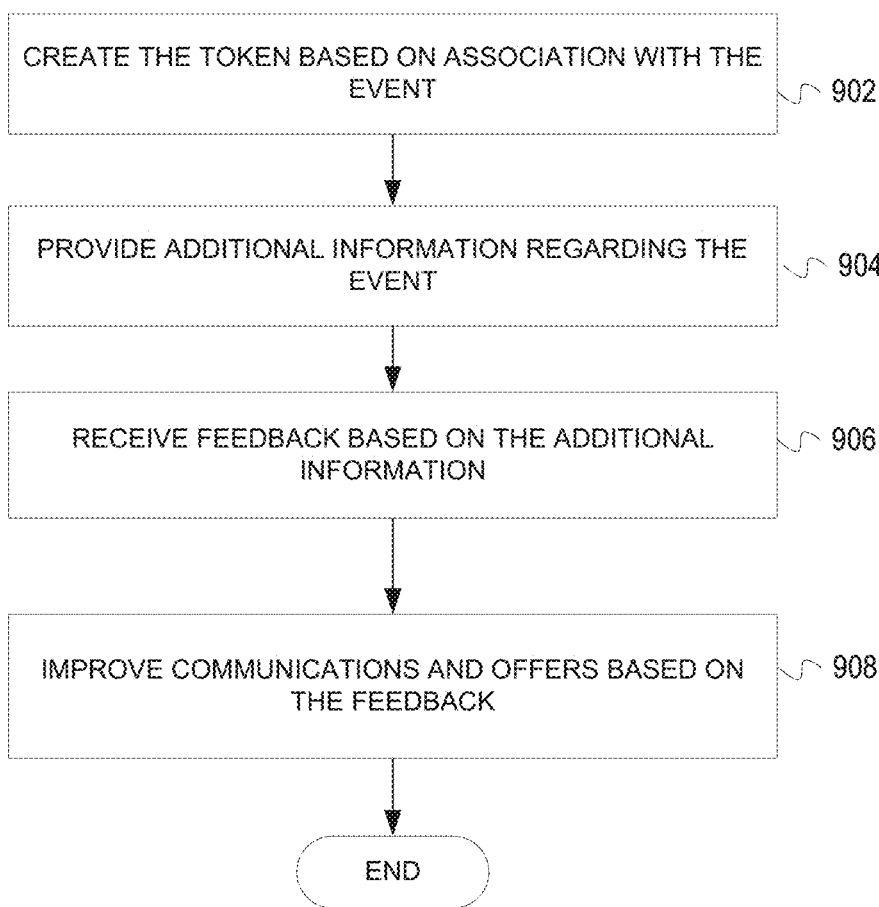
FIG. 9 is a flowchart of a process for improving offers utilizing tokens associated with an event in accordance with the illustrative embodiments.

FIG. 9 is a flowchart of a process for improving offers utilizing tokens associated with an event in accordance with the illustrative embodiments. The process may begin by creating the token based on user association with the event (step 902). In one embodiment, the user may have attended the event, is planning on attending the event, or has only heard of or is considering the event. The user may have previously attended the event and desires to attend future versions of the event. The user may be associated with the event based on marking the event as important. In one embodiment, the token may function as a virtual RSVP and may include a broad range of useable and desirable targeting data (e.g., potential attendance, confirmation, declined attendance, interested, monitoring, purchases/purchase plans, information from a user profile, and other information related to the event and/or user).

Next, the system provides additional information regarding the event (step 904). As previously noted, the system may provide information, such as date, location, price, attendance requirements, maps, navigation instructions, preparation documentation, invitations, calendar entries, surveys, reminders/alerts/notifications, or other applicable information.

Next, the system receives feedback based on the additional information (step 906). The feedback may include additional information regarding the event, implementation of the event, or other aspects of the event. The feedback may be received through direct or indirect messages, in-application messages, surveys, questionnaires, reviews, ratings, or so forth. In one embodiment, social media may be utilized to provide additional information, reminders, customized advertisements, and targeted products, events, and services.

Next, the system improves communications and offers based on the feedback (step 908). The system may adjust any number of factors, conditions, or actions based on the feedback of step 906. For example, the system may automatically adjust the price for the event. In response to determining there is a virtual barrier that individuals, businesses, organizations, or groups are unwilling to exceed. The system may also adjust how the event is marketed and advertised. For example, a particular social media channel may be utilized in response to determining sign-ups or invitations are being accepted through that social media channel. The event host or organizer may adjust their marketing, advertising, communications, or the event itself based on know your customer (KYC) efforts, enhanced data collection, and/or customer profiling. As a result, attendance, return on investment, profitability, engagement, reviews, recommendations, and other factors may be expanded to best optimize the optimize the event.

Figure 10:
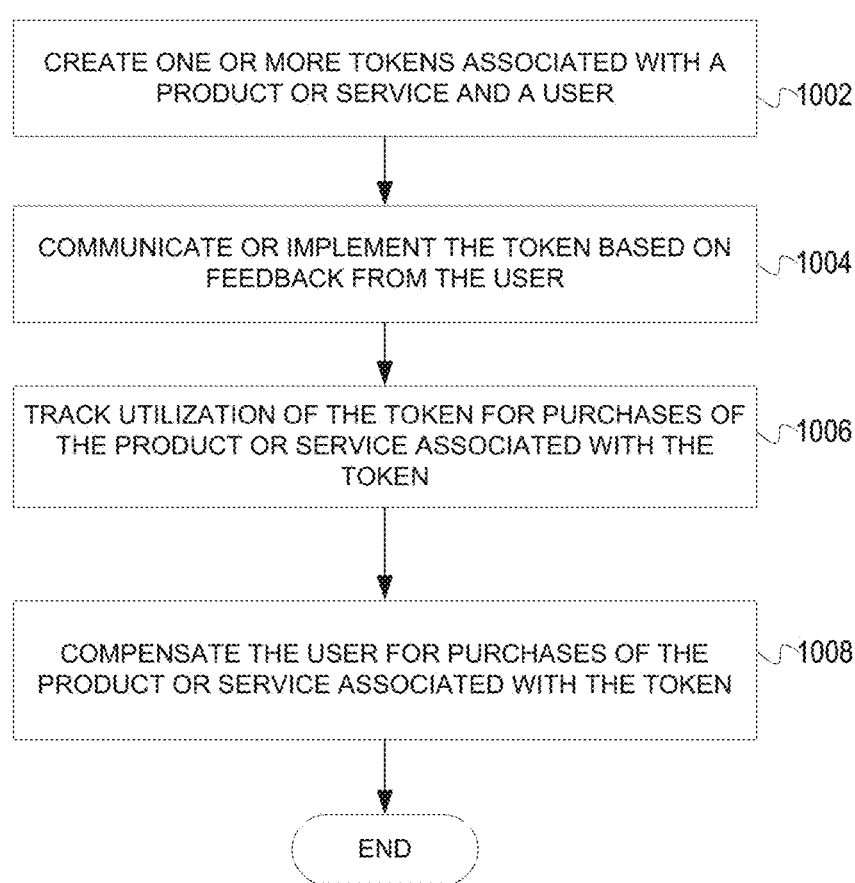
FIG. 10 is a flowchart of a process for monetizing utilization of tokens in accordance with an illustrative embodiment.

FIG. 10 is a flowchart of a process for monetizing utilization of tokens in accordance with an illustrative embodiment. In one embodiment, a token may only be created in response to authenticating and verifying that the product or service is associated with an authorized user (e.g., chief executive, sales manager, etc.). The system may perform any number of documentation and verification processes for products or services, such as verifying production, sales, purchase options, licenses, ownership, rights, and so forth.

The process may begin by creating one or more tokens associated with a product or service and a user (step 1002). The token may include information specific to the product/service and/or the user. In one embodiment, the one or more tokens may be associated with a smart contract. In one embodiment, the token may be utilized to verify ownership based on a purchase. As a result, warranties, indemnifications, service options, additional content, rights, files, or additional information, data, services, and products may be made available to the owner/recipient of the token. The token may be verifiable transferred between owners with the associated bundle of rights. As previously noted, the token may represent a blockchain token, such as a nonfungible token. In other embodiments, reviews, opinions, or other data may also be monetized.

Next, the system communicates or implements the token based on feedback from the user (step 1004.). In one embodiment, the token may be communicated, embedded, or integrated with any number of electronic messages, mobile applications, social networks, programs, scripts, sets of instructions, or so forth.

Next, the system tracks utilization of the token for purchases of the product or service associated with the token (step 1006). The system may track utilization of the token for purchases, views, engagements, or other monetizable activities. Any number of traditional monitoring services, such as cookies, contracts, codes, profiles, identifiers, or other information may be utilized to associate utilization of the token with the user.

Next, the system compensates the user for purchases of the product or service associated with the token in (step 1008). The user may be compensated in real-time, weekly, monthly, or based on another time period. The user may be compensated for actions performed based on the utilization of the tokens including, but not limited to, purchases, views, engagements, adding a good or service to a shopping cart, bookmarking/favoriting/liking the good or service, recommending the good or service or other similar recommendations. The user may be compensated utilizing hard currency (e.g., cash, direct deposit, etc.), cryptocurrency, coupons, discounts, or other payment methods.

FIG. 11 is a flowchart for compensating users for licensed tokens in accordance with an illustrative embodiment. The process may begin by receiving a token associated with content created by a user at a system managed by a service provider (step 1102). The content may represent any number of digital/virtual or physical assets, objects, or creations owned or controlled by a user. The token may represent a nonfungible token, blockchain token, or other token specifying control of the content. The content may have previously been received by the system or automatically uploaded as created, generated, prepared for monetization, processed, or otherwise utilized by the user. The content may represent art, photos, stories, poetry, paintings, videos, music, podcasts, software, patents/patent applications, copyrights, exclusive rights, limited usage rights, affiliate sales. digital creations, websites, webpages, tweets, blogs, clipart, domains, advertisements, sponsored content, consulting, physical assets, or items, subscriptions, memberships, online courses, webinars, paid content, virtual events, donations, or so forth.

Next, the system receives user preferences for licensing the token (step 1104). The user preferences may specify how the token may be licensed along with the associated content. The user preferences may be received through a user interface, mobile application, webpage, dedicated device, survey, questionnaire, prompt, message (e.g., text, in-application message, email, etc.) and/or another interface or device. In one embodiment, the user preferences may be utilized for a number of different tokens/content. The user preferences may specify information or terms, such as royalty rate, territory, scope, exclusivity, performance standards, term, renewals, usage limitations, distribution/redistribution rights, derivate work limitations, copies, termination, compensation/payments (e.g., upfront fees, payment schedule, royalties/licensee fees, etc.), indemnifications, warranties, accounting, reports, audits, and other positively or negatively recited terms.

Next, the system displays and communicates the token (step 1106). The token may be displayed, broadcast, or otherwise communicated. In one embodiment, the token may be displayed and communicated as part of a licensing, sales, or monetization process. For example, a library of available content and the associated tokens may be displayed as part of a content marketplace (e.g., webpage, mobile application, program, etc.), licensing system, or so forth. Any number of campaigns or sales processes may be utilized to maximize the opportunity of monetizing the token and content.

Next, the system licenses the token utilizing a smart contract with one or more parties according to the user preferences (step 1108). The license may be implemented automatically utilizing a smart contract between a buyer/licensee and the user/licensor/seller. The smart contract(s) may be implemented between any number of users.

Next, the system receives compensation for utilization of the licensed tokens (step 1110). The compensation may be received utilizing a single payment or multiple payments (e.g., periodic, usage based, by thresholds, etc.). The payments may be implemented utilizing currency, digital currency, cryptocurrency, or so forth. The compensation may be allocated between any number of users including the content owner(s) (e.g., individuals, corporate entities, organizations, etc.), content managers, distributing parties, or so forth.

FIG. 12 is a flowchart of a process for license tracking and enforcement in accordance with an illustrative embodiment. The process may begin by automatically searching for content associated with tokens managed by the system (step 1200). The automatic searching may be performed utilizing any number of automated and manual systems, software, and processes. Artificial intelligence or machine learning may also be implemented by any number of commercial, consumer, or other systems or devices. In one embodiment, the system may utilize an application implemented by user or consumer devices to search for content of any kind (e.g., music, videos, images, etc.) using the various components of the device including microphone, camera, transceivers, accelerometers, and/or other sensors of the device. Platforms, streaming services, and users may also be compensated to search for, identify, and report licensed or unlicensed usage of content. Content owners, licensors, assignees, distributors, and other companies, groups, and organizations may compensate individuals that search for, identify, and report information regarding utilization of content to ensure all usage is being performed properly.

Next, the system identifies the content (step 1202). The system may identify the content based on the searching performed during step 1200. For example, information, details, and metadata associated with the content may be identified. A digital fingerprint or biometric authenticator identifying information determined from the content or may be determined and utilized to identify the content and content owner. In one embodiment, an inaudible tone, audible tone, or light signal, frequency, or pattern may be associated with the content. The tone or signal may also be used as a secondary authenticator of content. ownership, authentication, power of attorney (POA), validity, rarity, and so forth.

Next, the system verifies utilization of the content by one or more parties is according to the license from the smart contract (step 1204). A license may represent an agreement, royalty, sale, license, download, utilization, or other rights established, controlled, managed, or limited by the smart contract. The license may specify how, where, when, and by whom the content is licensed, performed, managed, played, or otherwise used (and other terms controlling utilization of the content). In one embodiment, the verification may be performed utilizing a database that associates content, identifying information, and licenses or other agreements. Any number of servers or logic may be utilized to compare the information.

Next, the system determines whether the license is verified (step 1206). In one embodiment, a crowd sourced system may be utilized to identify content and determine whether the license for the content is verified. As noted, artificial intelligence and machine learning may also be utilized to determine whether the license is verified. The license may be verified if the terms of the smart contract are being legally met or honored.

If the license is not verified, the systems enforce the license against the one or more parties (step 1208). Enforcement may include any number of actions to ensure compliance with the license governed by the smart contract. For example, a smart contract may be established, compensation may be requested, a lawsuit may be filed, a complaint, arbitration, mediation, or a grievance may be utilized to ensure the content is properly licensed.

Next, the system collects license fees for utilization of the content associated with the tokens (step 1210). If the license is verified during step 1206, the system collects the license fees for utilization of the content associated with the tokens (step 1210). The license fees may be collected in currency (e.g., physical currency, digital transactions, etc.), cryptocurrency, or other allowed forms of transactions. The system may utilize any number of public, private, or third-party compensation systems, platforms, interfaces, portals, APIs, devices, or so forth to collect the license fees (and compensate the user).

Next, the system compensates the user according to the terms of the smart contract (step 1212). Any number of users, parties, entities, or organizations may be compensated according to the terms of the smart contract or other recorded agreements or information. For example, any number of parties that participated in creating, recording, preparing, or managing the content may be compensated for their roles according to the terms of the smart contract.

Figure 13:
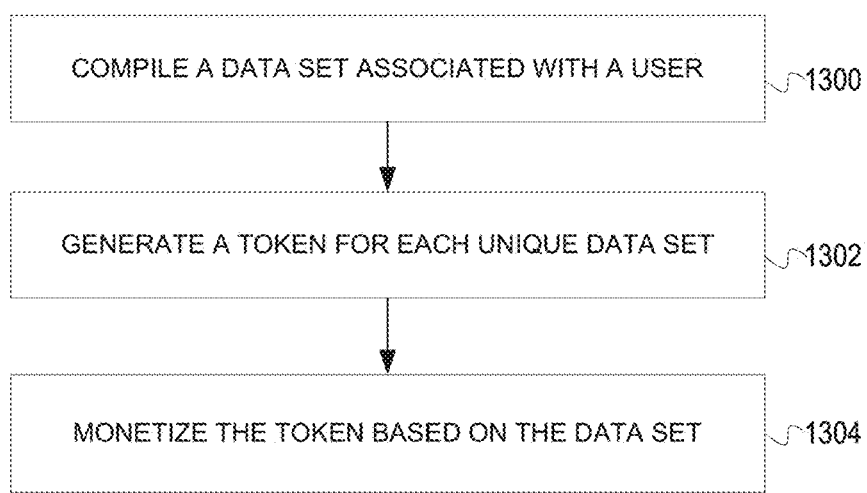
FIG. 13 is a flowchart of a process for monetizing data in accordance with an illustrative embodiment.

FIG. 13 is a flowchart of a process for monetizing data in accordance with an illustrative embodiment. The process may begin by compiling a data set associated with a user (step 1300). The platform may have specific requirements for the transition of data into a marketable and monetizable asset. For example, the data may have inherent value that may be improved by clustering distinct sets of data into a data pool. The value of a cluster data pool may be increased as the data pool is cross populated with new distinct data sets that add new data points to the data pool of continually accumulated data sources.

Next, the platform generates a token for each unique data set (step 1302). Any number of block chain systems or cryptocurrencies may be utilized to create tokens based on the data. The tokens utilized by the platform may represent cryptographic or digital tokens that manage the access rights to the data as tracked in a distributed ledger. Any number of blockchain systems, platform, and/or software may be utilized. All or portions of the different types of data (e.g., data/information, data sets, data pools, etc.) may be represented by the tokens.

In one embodiment, a smart contract may be created that allows the user's data to be utilized by the platform. The smart contract may be a program stored on a blockchain that runs and implements various actions when conditions, parameters, or settings are met.

Next, the platform monetizes the token based on the data set (step 1304). In one embodiment, the user's data may be monetized by the advertisements or direct offers that are provided to the user through the platform (e.g., advertisements displayed to the user through web browser, applications, tools, etc.). The user may specify the types of products, services, advertisements, and marketing she is willing to receive or is interested in. Advertisers may pay the platform for the right to advertise to the user and the platform (or service provider associated with the platform) may the pay or compensate the user (or the designated party). The users may also be compensated by sharing tokenized and encrypted personally identifiable information (PII). As a result, advertisers and other interested parties may have validated, current, and actionable consumer data points that are highly sought after. The tokens may be utilized by the user to directly control and monetize their data (e.g., web data, application data, profiles, personal measurements, readings, medical profile, diagnostics, etc.).

In one embodiment, the user may be compensated utilizing tokens associated with digital currencies, hard currencies (or conversion from digital currencies into hard currencies), charitable contributions, and tax deductions. The earnings for a user may also be donated, reallocated, or shared between users, entities, and organizations. Users may be rewarded for additional purchases, site visits, shared data, data uploads, updates, additions, confirmations, amendments, surveys/questionnaires completed, and so forth. In many cases, the user may only be required to allow, grant, approve, or turn on sharing of data. The tokens may be utilized to perform payments for products, systems, or information/data (e.g., to vendors, stores, third parties, etc.), secure a digital asset, tracking the life of an asset, share a stake in an asset or company, share in real or virtual real-estate, participate in an initial coin offering or subsequent distributions, receive a reward, maintaining and managing a digital asset, make a charitable contributions, receive tax deductions, donating real or virtual real-estate, or other applicable processes. The platform allows the user to select when, how, and what data is captured or otherwise received, as well as how, when, and where the data may be utilized, and how the user is compensated for utilization of their data. The user may change the applicable settings, instructions, configuration, or other applicable information at any time. Any number of bonuses (e.g., utilization, user referrals, longevity, updates, etc.), incentives, or other compensation may be paid by the platform as part of the tokens.

Figure 14:
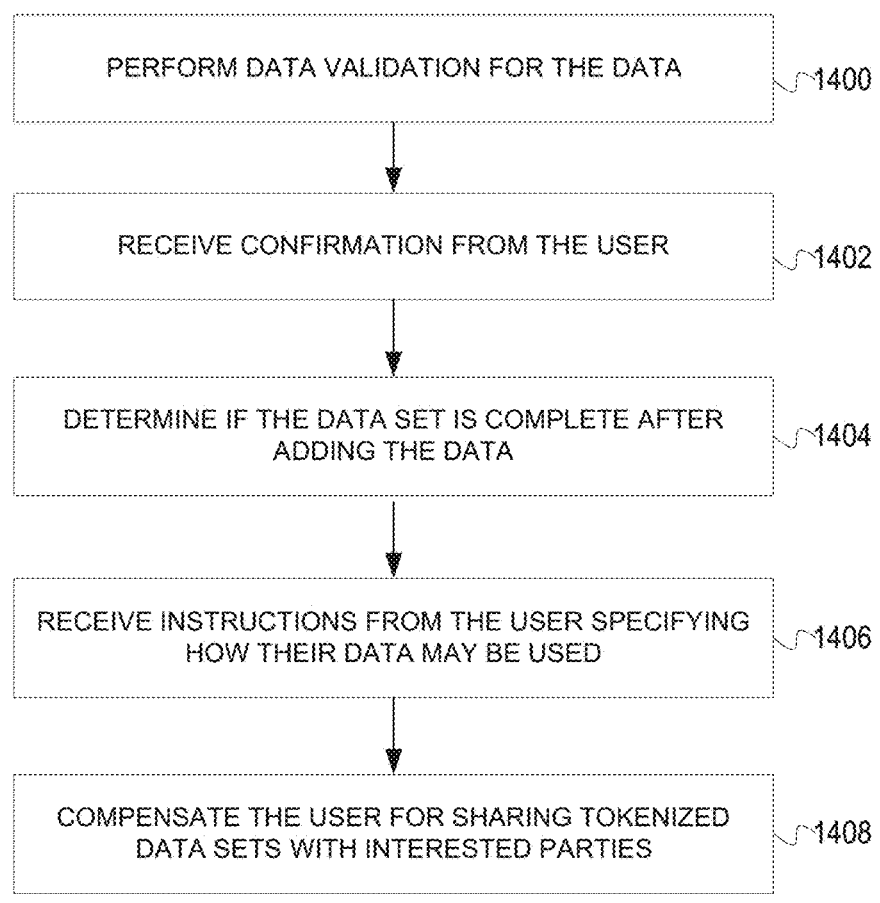
FIG. 14 is a flowchart of a process for utilizing data elements in accordance with an illustrative embodiment.

FIG. 14 is a flowchart of a process for utilizing data elements in accordance with an illustrative embodiment. The various data elements referred to in FIG. 14 may be tokenized via block chain for the purpose of authorizing, validating, authenticating, securing, confirming, valuing, and monetizing data elements (both consumer and commercial). The process may begin by performing data validation for the data elements (step 1400). In one embodiment, the platform may ensure that the data was received from the user. As is well known, in families and other groups, many users may individually access different wireless and computing devices. For example, devices such as tablets, smart phones, laptops, personal computers, gaming devices, electronic readers, and so forth may be utilized by a number of users. During step 400, the platform may verify the user associated with the data. In one example, as data is received, the user may ask a verification question, such as "is this Blair?" The platform may also utilize machine learning to recognize activities, programs, and behavior associated with each of a number of users that may utilize the electronic devices that are part of or in communication with the platform.

Next, the platform receives confirmation from the user (step 1402). Any number of processes may be utilized to perform confirmation. For example, user opt ins, surveys, codes/passwords/pins, biometrics recognition (e.g., facial recognition, fingerprints, etc.), buttons/interface selections, feedback, user input, and other active or passive selections may be utilized to receive confirmation from the user.

Next, the platform determines if the data set is complete after adding the data elements (step 1404). The platform may compare the data set to other data sets or digital profiles to look for missing, incomplete, or shared data elements or data sets. The platform may receive additional data as automatically searched out or received from the user.

Next, the platform receives instructions from the user specifying how their data may be used (step 1406). The user may specify how, when, and where their data elements, compiled data sets, and data profile may be utilized. For example, the granular level of authorization may include individual applications, companies, organizations, entities, and others that may access the data.

Next, the platform compensates the user for sharing tokenized data sets with interested parties (step 1408). The platform monetizes the data to ensure that the user is compensated for the receipt, analysis, processing, and utilization of the data. As previously noted, the user may elect not to receive earnings, payments, or the monetary benefit of the data being monetized. For example, the earnings (e.g., dollars, cryptocurrency, points, credit, discounts, rebates, etc.) may be donated, shared, or otherwise distributed to charitable groups, organizations and individuals, and so forth.

Figure 15:
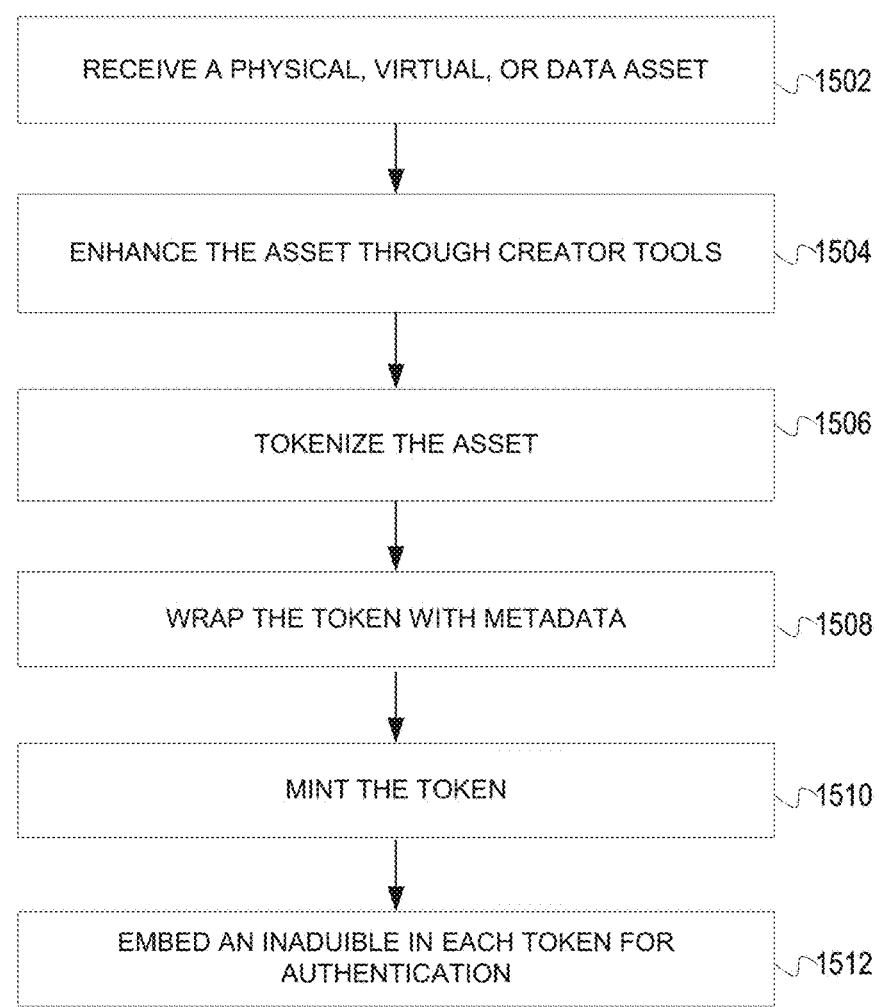
FIG. 15 is a flowchart of a process for creating a token in accordance with an illustrative embodiment.

FIG. 15 is a flowchart of a process for creating a token in accordance with an illustrative embodiment. The process of FIG. 15 may be utilized to perform lifecycle tracking for the asset or content associated with the token. The process may begin by receiving a physical, virtual, or data asset (step 1502). The asset may represent any number of NFTs, virtual assets, physical or digital art, music, collectibles, patents, copyrights, visual content or so forth. In one embodiment, information associated with the asset may also be received, such as one or more titles, creator/author/writer/artist, proof of authenticity, creation date/time, ownership rights and records (e.g., title, assignments, documentation, licenses, royalties, sales, etc.), registration or identification numbers, and applicable dates. In other embodiments, the asset may be created within the system itself. In one embodiment, the system may include a portal where users/creators may upload assets. The asset may include a photo, video, event, incident, file, digital content, moment, exchangeable image file format (EXIF), metadata, calendar data, communications, or other content. In one embodiment, the asset may be documented, validated, and/or otherwise authenticated by the system to ensure that it is valid and by an attributed party. The camera, microphone, and/or sensors of a wireless device may be utilized to capture a picture, video, moment, incident, event, or other appropriate content that may be considered an asset.

Next, the system enhances the asset through creator tools (step 1504). The assets may be enhanced through any number of tools, resources, or services. For example, digital assets may be refined through resolution enhancement, file conversion, digital processing, and so forth. The system may utilize artificial intelligence or machine learning to perform face recognition, voice recognition, location recognition, biometrics, object recognition (e.g., equipment, instruments, vehicles, etc.), machine face recognitions, or other forms of identification of information associated with the asset or content. In one embodiment creators may upload assets, enhance the asset through creator tools used to document various aspects of the asset or data. The minting process tokenizes the asset, wraps it with metadata, attaches a smart contract, mints the tokenized asset to a private block creating an actual NFT, and provides an exchange/marketplace for the buying, selling, trading of the NFTs on the private block. Some examples of tokenizable assets may include a sports league (the creators including at least the teams/owners/players), a film studio (the creators including at least the movie teams/participants), a music label (the creators including at least the artists/bands/contributors/professionals), an art gallery (the creators including at least the artists), a consumer brand (the creators including at least the company designers/marketers), a consumer marketplace or platform (the creators including at least the consumers within the marketplace), private NFT exchanges, and other similar consumer, commercial, industrial, or retail groups.

The creator tools may also help the user establish ownership, control, management, or other rights to the asset. For example, the creator tools may include title, escrow, patent protection, copyright protection, trademark protection, contractual protection, and other controls for the assets. The creator tools may coordinate with one or more law firms or legal service providers to prepare and file for intellectual property rights in the appropriate jurisdiction(s). As a result, the associated intellectual property rights for the asset may be protected, documented, or filings implemented to initiate protection. In another example, authentication and verification tools may be utilized to verify and authenticate the asset.

Next, the system tokenizes the asset (step 1506). One or more tokens may be associated with the asset based on the preferences, settings, and requirements of the asset owner/creator/manager. In one embodiment, the asset may be tokenized as a nonfungible token. The asset may also be tokenized as another type of blockchain token associated with the asset and additional user specified information.

Next, the system wraps the token with metadata (step 1508). The metadata is associated with the asset and may be retrieved based on the uploaded information, documentation, or records of step 1502. The metadata may include investment information, stock holdings, purchase plans, purchase date, purchase location, loyalty programs, purchase plans, brand affinities, ownerships, avatars, basket of goods analysis, global positioning system (GPS) coordinates, asset purchase or license data, biometric, and other data.

Next, the systems mint the token (step 1510). The tokenization and minting process may be used across any digital asset such as an NFT or any virtual or real-world asset type, digital creations, data type and is used to convert any real world or digital asset into a tokenized crypto based asset. This process can be used to mint real world and digital collections of all types, real and digital assets, recorded on the blockchain. The digital assets, products, data, and files may be permanently stored and tracked in a distributed ledger or decentralized database that cannot be edited, modified, or deleted.

As a secondary asset validation tool, NFT's or other asset types may be further minted and validated through the inclusion and utilization of inaudible tones or other watermarks or other known asset tracking mechanisms to ensure the ownership, authenticity, validity, and integrity of each tokenized item. The inaudible tones may be embedded into virtual items and into real-world items and may provide unlimited tokenized data about the object of value. The inaudible tones or other signal may also track the purchase, sale, and license of each unique NFT over time. A unique improvement is provided around the NFT creation and minting process when an inaudible tone or signal is embedded into a virtual item providing an additional indicator of item authenticity and validity that may be used to license, track or limit usage of an NFT once it has been purchased. In this example the tone is unique to the NFT and cannot be replicated outside of the single use tone or modifiable tone assigned to each NFT. Each new purchase exchange or licensing instance of an NFT is assigned a new unique tone that again cannot be replicated outside of the existing NFT. In one embodiment an audible tag or inaudible tone tag is embedded into each individually minted NFT, for the purpose of NFT authentication. The tone is digitally or physically tagged with an individual identification and the NFT and may indicate when an embedded tone is found outside of the application at the network level or within a platform or 3$^{rd}$ party user uploads or downloads content that contains the identifiable tag. Any misuse of protected content can indicate the 3rd party user is potentially legally liable for infringement of any registered and protected content. In one embodiment spectrograph analysis of the wavelength is utilized as part of the identification and service response process. This tone identification may be performed at the network or platform level or could be confirmed by a sound engineer or other audio professional. This ability to identify and validate tone transmission payloads may be identified for authenticity or copyright infringement and may utilize a broad range within the tone spectrum to indicate each a unique wavelength structure and data or service response contained and enabled through the tone file. The platform may utilize a blockchain based or an internal or external safe storage component where any tokenized data or NFT may be secured in a real world physical vaulted safe, virtually on the blockchain, within the platform or on an external hard drive or other inaccessible storage location. This process allows a user virtually or physically to add or remove an asset, NFT, token or specified data from the vault for the purpose of creating a current market valuation for the token or to indicate the data or NFT is now for sale or to indicate an asset is no longer for sale. Any tokenized asset may also be added or removed from the vaulted safe for the purpose of selective availability or for creating or increasing scarcity or rarity around an NFT or other data tokens or data assets.

The vaulted safe may be a virtual safe storage or real-world physical safe and is used in combination with a consumer or corporate banking-based widget tied to a consumer owned banking data valuation account for added security, the widget is embedded into a website that obscures or prevents access to a user web profile as they utilize standard web resources through web-browsing or other online activities preventing 3$^{rd}$ party access to a consumer's online profile or any tokenized data or personal data through standard and recognized cookie based online tracking. The illustrative embodiments provide each platform user with greater control over the sharing and monetization of any tokenized data, NFT's, assets, personal data, structured data, semi-structured data, and unstructured data collected from various websites and webservices. Also illustrated is the ability to market and sell tokenized data within an NFT Marketplace that provides an intuitive user interface and seamless NFT searching and transactions (e.g., enhanced buying experiences).

The platform may collect, categorize, tokenize, and value personal data, such as user location, device type, IP address, consumer actions, consumer intent, which advertisements you have clicked or selected and so forth. Additional data related to device specifications may be captured including device operating system, computer and graphical processing unit (GPU) types, screen resolution, browser plugins. Additional personal identifiable information (PII) data may be requested, shared, or collected using tokenized data exchanges where the data profile is monetized based on user determined preferences for each data exchange type. The platform allows a consumer to tokenize and make the tokens available for monetization or to store/vault, hide, or obscure all of their PII and website interactions, utilizing the block-chain to secure their data until the access to the data is tokenized, granted for access, and monetized by the consumer. Once the user grants access to the data, the data may be transferred to an advertiser as tokenized data. This consumer data monetization process is uniquely used to provide the consumer direct control to grant or deny access to each component of their personal and consumer data.

Additionally, consumer data related to a basket of goods may also include purchase plans, past purchases, asset holdings, stock holdings, and receipt tracking on each basket of goods or other purchase documentation may be tracked for the purpose of making product and purchase suggestions based on user purchase plans, event plans, product and stock ownership and other consumer or financial data contained in the consumer data profile. The advantages provided to advertisers, businesses and services are enhanced when a clear and direct path to consumers is improved through the ability to directly access and solicit interested parties, directly utilizing this type of direct to consumer advertising platform that may also make an almost unlimited number of direct to consumer recommendations, solicitations, offers, and so forth based on any relevant consumer data points or real or digital assets, that a user adds to their data profile, data avatar, or tokenized consumer profile.

Next, the system embeds an inaudible tone in each token for authentication (step 1512). The tone may include an audible tone or inaudible tone that establish proof of authenticity. In one embodiment, the inaudible tone is a tone that is not inaudible (unable to be heard or discerned) by the human ear. The inaudible tone may include a single frequency or multiple frequencies. The inaudible tone may also have embedded content or digital signals. The tone may alternatively be an identifier or watermark, such as an optical signal, radio frequency signal, or other actively or passively emitted identifier. In other embodiments, the token may be associated with a wavelength (e.g., single frequency, multiple frequency, intermittent/coded, etc.). The tone or other identifier may be utilized to provide additional information regarding the asset, content, token, or other aspect of the process or system.

Figure 16:
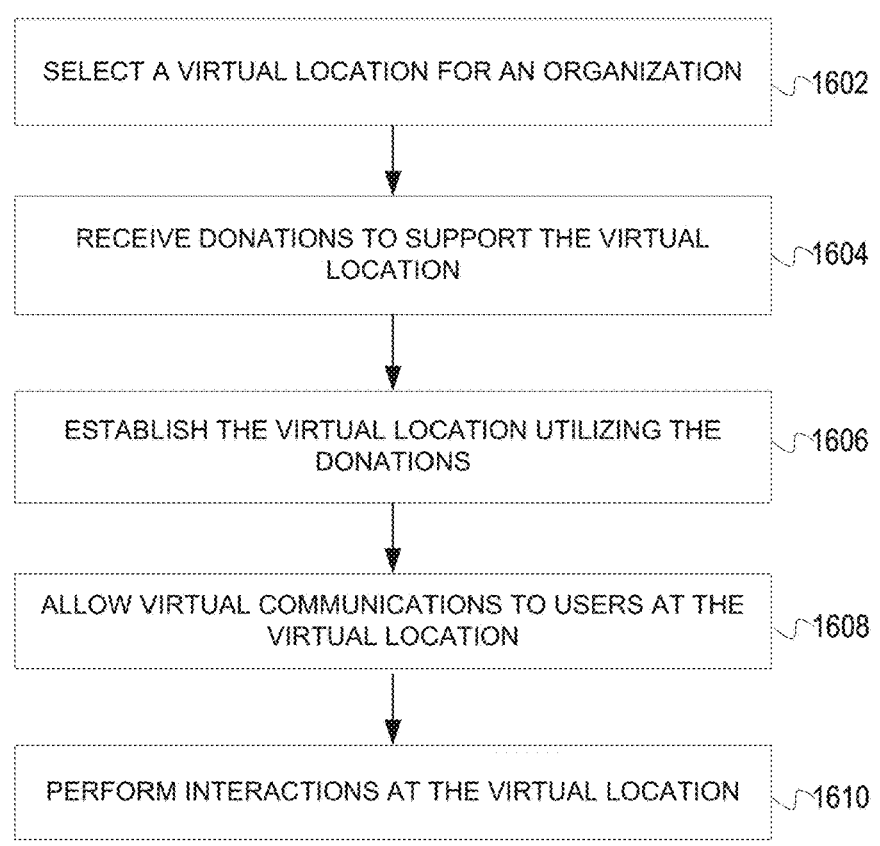
FIG. 16 is a flowchart for managing a virtual location in accordance with an illustrative embodiment.

FIG. 16 is a flowchart for managing a virtual location in accordance with an illustrative embodiment. The virtual location may represent any number of churches, schools, entities, businesses, or other organizations. The organizations may represent any number of religious, secular, educational, for-profit, non-profit, or other organizations.

In one embodiment, the process may begin by selecting a virtual location for an organization (step 1602). The virtual location may be located within any number of virtual environments whether publicly or privately stored and accessible. The virtual location may be managed through any number of networks, servers, platforms, systems, and/or devices.

Next, the system receives donations in the real world or virtually to support the virtual location (step 1604). The donations may represent digital transfers, physical currency, cash, cryptocurrency, virtual properties, storefronts, buildings, items, assets, or objects, or so forth. The donations may be utilized to build the virtual location. For example, the virtual location may represent an exact virtual representation of a place of worship (e.g., church, temple, synagogue, mosque, house of worship, spiritual location, etc.) or other gathering place established in a virtual environment (e.g., metaverse, virtual environment, virtual business, virtual pop-up shop, etc.). In addition, the donations may represent virtual land, virtual buildings, currency, cryptocurrency, digital items, or other funds that support the establishment, construction, or building of the virtual location.

Next, the system establishes the virtual location utilizing the donations (step 1606). The virtual location is established, built, constructed, or assembled utilizing any number of processes. For example, the virtual location may be pre-built, assembled by users, programmed, constructed from digital assets and materials, or so forth. Any number of designs may be utilized. In one embodiment, the virtual location may be similar in appearance and structure to real properties that exist in the real world (e.g., churches, buildings, etc.).

Next, the system allows virtual communications to users at the virtual location (step 1608). The virtual communications may represent attendance at events or activities. For example, a sermon, talk, lesson, sermon, talk, class, ritual, ordinance, religious service, activity, or other event may be held for parishioners, members, worshipers, or users at a virtual church. Any number of different forums, communities, events, or activities may be attended at the virtual location. For example, a user may utilize an application, virtual reality system (e.g., headset, glasses, etc.), gaming systems, computer (e.g., laptop, desktop, tablet, etc.), or other device to navigate to, observe, interact (step 1610), and otherwise participate at the virtual communications.

Next, the system performs interactions at the virtual location (step 1610). The interactions may include the communications of step 1608. The interactions may include fundraising, service, team building, communications sessions, classes, seminars, professional education courses, support groups, forums, and so forth. Virtual communications and interactions may be open to all, limited, require credentials (e.g., username, password, pin number, pass code, identifiers, etc.), or by invitational only. Communications and interactions may be performed utilizing tokenized content, encryption, secure communication protocols, or so forth.

The system may also receive information associated with the virtual location. For example, the information may include the organization associated with the virtual location, associated pastors, evangelists, teachers, Bishops, Rabbis, lecturers, gurus, holy people, or other individuals associated with the virtual location, event/meeting schedule (e.g., date, time, location, etc.), attendance requirements, doctrinal information, and other applicable information associated with the virtual location or organization. The system may also receive authentication or identification information, such as tokens, keywords, passwords, usernames, or other identifiers. An additional event embodiment would utilize past or forthcoming events or travel plans to allow for a direct connection for local businesses, advertisers, shops, services in a specific area to access tokenized user plans to provide offers, solicitations, deals, specials, to users that may not typically visit their establishment or live in their area or state. This allows for a more highly localized and targeted advertisements for consumer interaction to a confirmed receptive audience.

Figure 17:
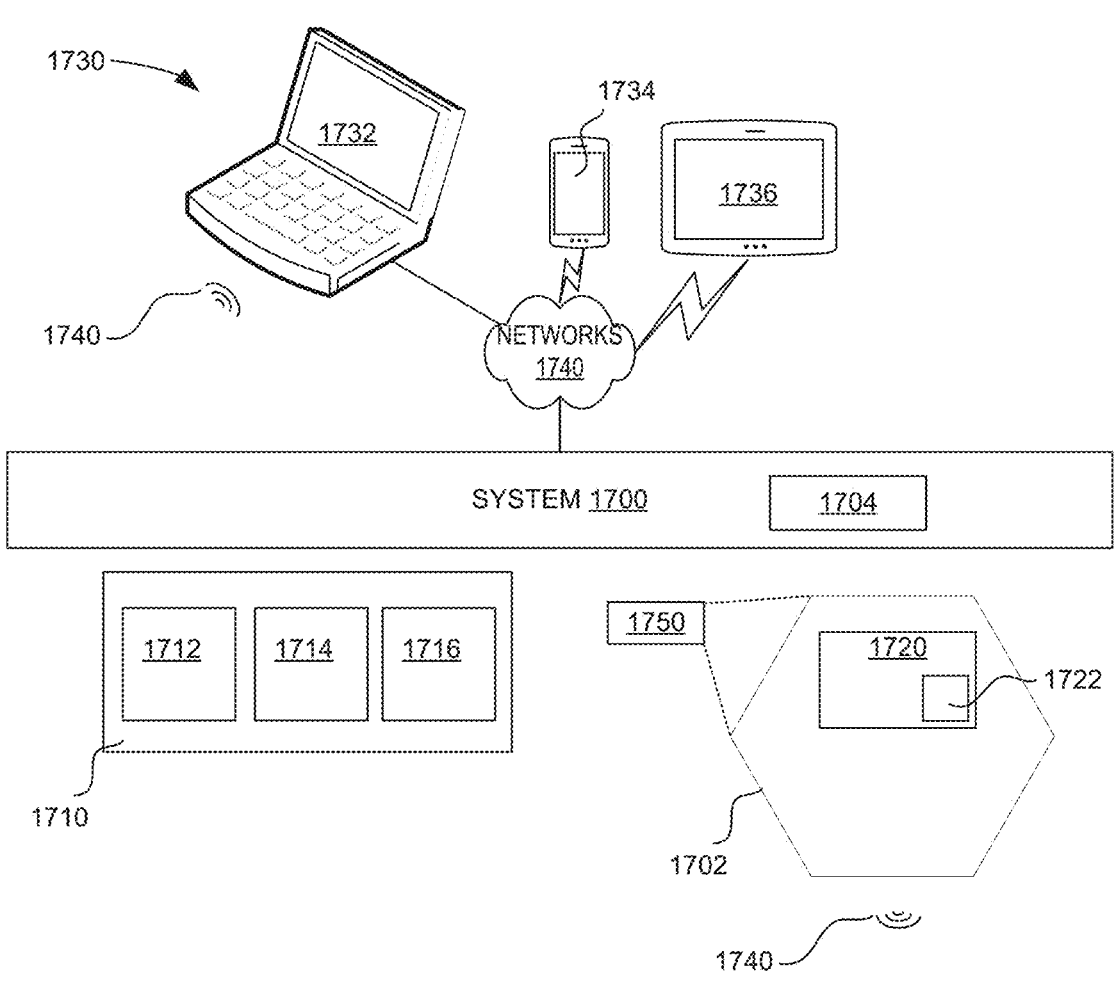
FIG. 17 is a representation of a token created based on an asset in accordance with an illustrative embodiment.

FIG. 17 is a representation of a token created based on an asset in accordance with an illustrative embodiment. In one embodiment, a system 1700 may be utilized to create a token 1702. The associated between the token 1702 and the asset 1710 may be one-to-one. Alternatively, the asset 1710 may be controlled by multiple tokens. The tokens may represent a nonfungible token. The token 1702 may represent an asset 1710. The asset may represent one or more of physical assets 1712, digital asset 1714, or virtual asset 1716. The token 1702 may include an audible tag 1720. In one embodiment, the audible tag 1720 may include an audible identifier 1722. The audible identifier 1722 may include a unique alphanumeric identifier that is utilized to identify the asset 1710 associated with the token 1710. The audible tag 1720 and audible identifier 1722 may alternatively be referred to as a tag and identifier especially if different broadcast/signal types are used (e.g., light, sensors, etc.).

The system 1700 may include a registry 1704. The registry may store all data and information associated with the audible tag 1720 including information and data relevant to the token 1702. The audible tag 1720 may represent the audible identifier 1722 at a specific frequency. As previously noted, the audible identifier 1722 may include inaudible tones/signals, audible tones/signals, optical signals, and/or a combination thereof. The audible identifier 1722 may include encoded data, patterns, or so forth. The data may be easily read or may be encrypted.

In one embodiment, any number of electronic devices 1730, such as a personal computer 1732, smart phone 1734, tablet 136, or other electronic devices (e.g., appliances, servers, security systems, commercial electronics, gaming devices, etc.) may be configured to listen for or detect the audible tag 1720 and the associated audible identifier 1722. The electronic devices 1730 may communicate with the system 1700 through any number of networks 1740. The networks 1740 may represent one or more wireless, satellite, wired, private, public, or other networks.

When the token 1702 is created the token 1702 includes or is associated with the asset 1710. The audible tag 1720 may be included in the digital asset 1714 or virtual asset 1716 (e.g., added, asset modified, new version created, etc.). The audible tag 1720 may be associated with the token in the registry 1704. The audible tag 1720 and audible identifier 1722 may be issued by an individual, company, organization, external sources, and/or a combination thereof. The audible tag 1720 may be utilized to perform validation and authentication of an NFT, such as the token 1702. The integrity of the asset 1710 may be further protected utilizing the audible tag 1720. In one embodiment, the token 1710 may be uploaded, moved, or stored in a chip 1750.

The chip 1750 may include all or some of a processor/logic, memory, speaker, microphone, transceiver/interface, and/or sensors. The chip 1750 may be attached to or integrated with the physical asset 1712. As a result, the token 1702 may be better utilized to identify the physical asset 1712. The audible tag 1720 may be inserted by the originator, owner, creator, or other rights holder of the asset 1710 as part of the tokenization process or other processes. The audible tag 1720 may be utilized to track the purchase, sale, license, transfer, or changes to the token 1702 and associated asset 1710 over time.

When the token 1702 is opened, viewed, transacted, or otherwise engaged, the audio tag 1720 may be activated to emit a signal 1740, such as a sound (e.g., audible or inaudible), or light signal (e.g., visible light, ultraviolet, infrared, etc.). As noted, the electronic devices 1730 may detect the signal 1740 to identify the token 1702 and associated information and data including the audible tag 1720 and audible identifier 1722 (see for example FIG. 12 including steps 1200 and 1202).

In one example, a movie trailer may be tokenized into the token 1702. The company associated with the movie trailer may generate an audible tag 1720 including the unique audible identifier 1722 that may be included within the movie trailer itself. The registry 1704 may record information specific to the movie trailer including all of the applicable information associated with the token 1702.

The registry 1704 may also create a log associating the audible identifier 1722 with the asset 1710, metadata, audible identifier 1722, and other related information. In one embodiment, the registry 1704 may be or write data to a blockchain. For example, when the token 1702 is utilized (e.g., played, sold, referenced, etc.) an electronic device, such as a smart phone may "hear" the audible tag 1720 to transmit the data base to the registry 1704. The registry 1704 may perform a lookup (or other database functionality) of the registry 1704 itself or associated databases, memories, servers, blockchains, or so forth. For example, a lookup of the audible identification 1722 may be utilized to perform authentication or verification of proper use, compensation, distribution, or so forth.

In one embodiment, the audible identifier 1722 may be mapped to a purchase cost, license fee, royalty, transaction fee including a specified amount of currency. The currency may be fixed or fluctuating (e.g., real-time updates). The currency or compensation may represent hard currency, cryptocurrency, rebates, discounts, or other forms of compensation.

In another example, the token 1702 may be utilized to purchase a ticket to an event. The ticket may require a specific amount of tokens or currency within the token 1702 to purchase access to the event. When the token is applied to the purchase, entry, or verification the audible tag 1720 may be emitted along with the audible identification 1722. The registry 1704 may be utilized to determine whether the token 1702 is sufficient to implement a transaction (e.g., sufficient cryptocurrency, tokens, cash, credits, etc.).

The system 1700 may map the audible identifier 1722 to a set of licensing rules related to the asset 1710. The rules may provide information regarding, where, when, what, and how the asset may be licensed, distributed, utilized, communicated, transferred, or so forth. In one embodiment, the licensing rules may be stored in a smart contract associated with the token 1702 that may be stored in the registry 1704.

In one embodiment, the asset 1710 may be a song. The song may have limited distribution rights by the holder of the token 1702 for distribution through a stream platform or provider. When the digital asset 1714/song is tokenized as token 1702 the audible tag 1720 along with the audible identifier 1722 may be inserted and mapped to the song and licensing information and metadata. The token 1702 may then be distributed by a music label to a distributor. When the token 1702 is utilized to play the song, the audio identification may be heard or found by the registry 1704. As a result, the registry 1704 may ensure that the license rights are being honored and maintained. In addition, the registry 1704 may also ensure that proper payments or compensation for the song are being implemented.

The assets 1710 may also represent physical, digital, virtual, or other forms of memorabilia. The memorabilia may relate to sports, entertainment, science, education, and any number of other topics. For example, the assets may include (new or used) baseball player profiles, baseball hats, uniforms, cleats, bases, game balls, practice balls, pads, kicking tees, pucks, pads, skates, helmets, car parts, tires, and other gear, equipment, or so forth. For example, sports memorabilia may relate to recreational, amateur, high school, semi-professional, college, professional (e.g., NBA, NFL, NHL, MLB, etc.), Olympic, or other levels of athletes. Ownership of memorabilia may be owned entirely, in part, or in fractions (e.g., equal or inequal).

In one embodiment, the physical assets 1712 may represent gold, precious metals or stones that may be tokenized based on information, such as karats, weight, quality, clarity, and so forth. The valuation typically uses the value equals quantity times price (V=Q*P) as one measurement tool, but other factors may be considered and utilized. The token 1702 that is created based on the asset may also include information regarding the country of origin, manufacturing processes, companies involved, and so forth.

The precious asset may represent any number of virtual or physical assets or items that are valuable, collectible, or have monetary, intrinsic, or sentimental value. The precious asset may also represent crude, raw, processed/refined, or other land, crops, natural resources (e.g., gold, gems, metal, rare earth elements or materials, etc.), mined or unmined precious metals or gems or other materials or items. In some instances, the item is additionally documented with an RFID, tone, inaudible tone, chip, sticker, or other additional tracking device which may be used to provide additional authenticity and item verification.

In one embodiment, the process may begin by receiving a precious asset. The precious asset may be received by an escrow group, repository, bank, financial institution, or other group authorized to receive and process precious assets. The precious asset may represent a precious metal, gem, or stone. In another embodiment, the precious asset may also represent artwork, paintings, collectibles (e.g., sports, non-sport activities, sports cards, used in game items, stamps, coins, vintage clothes, toys, comics, vehicles, collections etc.) and sporting memorabilia, or any physical items with actual or perceived value. In one example, the precious asset may represent one or more diamonds, platinum, gold, silver, and so forth. In another example, the precious asset may represent unmined diamonds, coal, lithium, or precious metals that are still in the ground. For example, a specified location, parcel, claim, vein, acreage, or geographic space may be designated.

The process determines information regarding the precious asset. The information may describe the year of creation/discovery, location associated with the precious asset, manufacturer/discovering party, previous owners, value (e.g., appraised, intrinsic, expected, sold, etc.), description, and other applicable information. For example, where the precious asset is a precious metal or stone, the information may indicate the material type, number of karats, weight/troy ounces/pounds, stone quality, clarity, country of origin, mine/discovery location, processing information, previous owners, chain of title, modifications, maintenance, and so forth. The quantity and quality of the precious asset are very important to determine.

The features, steps, and components of the illustrative embodiments may be combined in any number of ways and are not limited specifically to those described. In particular, the illustrative embodiments contemplate numerous variations in the smart devices, smart contracts, and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A system for tokenizing an event, comprising:

a plurality of electronic devices including at least a camera and a microphone executing a data application, the data application is configured to receive input through the camera or the microphone and automatically search within the input and analyze the input for protected content items associated with one or more tokens managed by the system, wherein the protected content items comprise copyrighted or licensed digital media assets;

a data platform comprising one or more servers accessible to the plurality of electronic devices through one or more networks, each server comprising a processor and a memory storing instructions that, when executed by the processor cause the one or more servers to identify the protected content utilizing machine learning analysis of the input and digital footprints of the protected content items, including at least one digital fingerprint stored in a database, verify utilization of the protected content items by one or more parties is according to the license of a smart contract stored on a distributed ledger, automatically record license utilization events in the distributed ledger, collect license fees for utilization of the protected content items associated with the one or more tokens from one or more parties, and compensate the user according to the terms of the smart contract using the license fees obtained from the one or more parties.

2. The system of claim 1, wherein the cameras, microphones, or sensors of the plurality of electronic devices provide input, the data application configured to automatically search for the protected content items within the input.

3. The system of claim 1, wherein the data platform generates the one or more tokens associated with the protected content items, wherein the one or more tokens are nonfungible tokens.

4. The system of claim 1, further comprising:
one or more databases in communication with the data platform, wherein the protected content items, the smart contract, and the digital fingerprints are stored in the one or more databases.

5. The system of claim 1, wherein the protected content items comprise at least one of an art item, a photography item, a video item, a music item, or a patent item.

6. The system of claim 1, wherein the digital fingerprints include one or more inaudible tones.

7. The system of claim 1, wherein the tokens are nonfungible blockchain tokens utilized to tokenize the content.

8. The system of claim 1, wherein the plurality of electronic devices include at least smart phones.

9. The system of claim 1, wherein the plurality of electronic devices include at least dedicated monitoring devices for the event.

10. The system of claim 1, wherein the owners of each the plurality of electronic devices are compensated for utilizing the data application to receive the input.

11. The system of claim 1, wherein the machine learning analysis is configured to ensure accuracy by comparing input against a hierarchical set of digital fingerprints stored in a protected-content database.

12. A system for tokenizing an event, comprising:
a plurality of electronic devices including at least a camera and a microphone executing a data application, the data application is configured to receive input through the camera or the microphone and automatically analyze the input to detect protected content items associated with one or more tokens managed by the system, wherein the protected content items comprise copyrighted or licensed digital media assets;
a data platform comprising one or more servers accessible to the plurality of electronic devices through one or more networks, each server comprising a processor and a memory storing instructions that, when executed by the processor causes the one or more servers to identify the protected content items based on machine learning analysis of the input and one or more inaudible tones associated with the protected content items, verifies utilization of the protected content items according to a license defined in a smart contract stored on a distributed ledger, collect license fees for utilization of the protected content items associated with the one or more tokens, and compensates the user according to the terms of the smart contract using the license fees.

13. The system of claim 12, further comprising:
one or more databases in communication with the data platform, wherein the protected content items, the smart contract, and the digital fingerprints are stored in the one or more databases.

14. The system of claim 12, wherein the plurality of electronic devices include at least dedicated monitoring devices for the event and/or at least smart phones of attendees of the event.

15. The system of claim 12, wherein the owners of each the plurality of electronic devices are compensated for utilizing the data application to receive the input.

16. The system of claim 12, wherein the machine learning analysis is configured to reduce false-positive detection of protected content items by applying a multi-stage model that compares the input against a hierarchical set of digital fingerprints stored in a protected-content database.

* * * * *